(12) United States Patent
Kimura et al.

(10) Patent No.: US 8,824,798 B2
(45) Date of Patent: Sep. 2, 2014

(54) INFORMATION PROCESSING DEVICE, COMPUTER READABLE MEDIUM STORING INFORMATION PROCESSING PROGRAM, AND INFORMATION PROCESSING METHOD

(75) Inventors: Shunichi Kimura, Kanagawa (JP); Satoshi Kubota, Kanagawa (JP); Ikken So, Kanagawa (JP); Masanori Sekino, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 872 days.

(21) Appl. No.: 12/716,829

(22) Filed: Mar. 3, 2010

(65) Prior Publication Data
US 2011/0044539 A1 Feb. 24, 2011

(30) Foreign Application Priority Data

Aug. 20, 2009 (JP) ................................ 2009-190890
Dec. 3, 2009 (JP) ................................ 2009-275746

(51) Int. Cl.
*G06K 9/00* (2006.01)
*G06K 9/36* (2006.01)

(52) U.S. Cl.
CPC ................................ *G06K 9/00463* (2013.01)
USPC ........... 382/175; 382/112; 382/176; 382/180; 382/181; 715/234

(58) Field of Classification Search
CPC .......... G06K 9/00469; G06K 9/00442; G06K 9/00463
USPC ........... 382/175, 112, 176, 180, 181; 715/234
See application file for complete search history.

(56) References Cited

U.S. PATENT DOCUMENTS

| | | | | |
|---|---|---|---|---|
| 5,784,487 A | * | 7/1998 | Cooperman | 382/175 |
| 5,987,171 A | * | 11/1999 | Wang | 382/173 |
| 6,014,458 A | * | 1/2000 | Wang | 382/176 |
| 6,035,061 A | | 3/2000 | Katsuyama et al. | |

(Continued)

FOREIGN PATENT DOCUMENTS

| | | |
|---|---|---|
| JP | A-05-274471 | 10/1993 |
| JP | H 08-88755 A | 4/1996 |

(Continued)

OTHER PUBLICATIONS

Ha, et al. "Document Page Decomposition by the Bounding-Box Projection Technique." Proceedings of the Third International Conference on Document Analysis and Recognition. 3. (1995): 1119-1122. Print.*

(Continued)

*Primary Examiner* — Michael A Newman
(74) *Attorney, Agent, or Firm* — Oliff PLC

(57) ABSTRACT

An information processing device includes: a document receiving unit that receives a document containing at least one page, wherein positions of document components of a page of the at least one page are fixed within the page; a page dividing unit that divides the document received by the document receiving unit into at least one page; a page heading determining unit that determines a heading of a page of the at least one page divided by the page dividing unit based on components included in the page; and a processing unit that assigns the heading determined by the page heading determining unit to the page divided by the page dividing unit as first level outline information of the page.

15 Claims, 26 Drawing Sheets

(56) References Cited

U.S. PATENT DOCUMENTS

| | | |
|---|---|---|
| 7,099,507 B2 | 8/2006 | Ouchi |
| 7,305,612 B2 * | 12/2007 | Chakraborty .................. 715/221 |
| 7,810,026 B1 * | 10/2010 | Shagam et al. ............... 715/242 |
| 2003/0156754 A1 | 8/2003 | Ouchi |
| 2006/0080309 A1 * | 4/2006 | Yacoub et al. ..................... 707/4 |
| 2006/0282760 A1 * | 12/2006 | Tanaka .......................... 715/509 |
| 2007/0009161 A1 * | 1/2007 | Hollingsworth ............. 382/229 |
| 2007/0116359 A1 * | 5/2007 | Ohk ............................... 382/176 |
| 2009/0087094 A1 * | 4/2009 | Deryagin et al. ............. 382/180 |
| 2009/0144605 A1 * | 6/2009 | Radakovic et al. ........... 715/200 |

FOREIGN PATENT DOCUMENTS

| | | |
|---|---|---|
| JP | A-08-287189 | 11/1996 |
| JP | A-09-134406 | 5/1997 |
| JP | A-2000-148788 | 5/2000 |
| JP | 2008-305088 A | 12/2008 |
| WO | WO 0157786 A1 * | 8/2001 |

OTHER PUBLICATIONS

El-Shayeb, et al.. "Extracting the Latent Hierarchical Structure of Web Documents." SITIS 2006: 385-393. 2006. Print.*

Office Action issued in Japanese Application No. 2009-275746 mailed Oct. 15, 2013 (with English Translation).

* cited by examiner

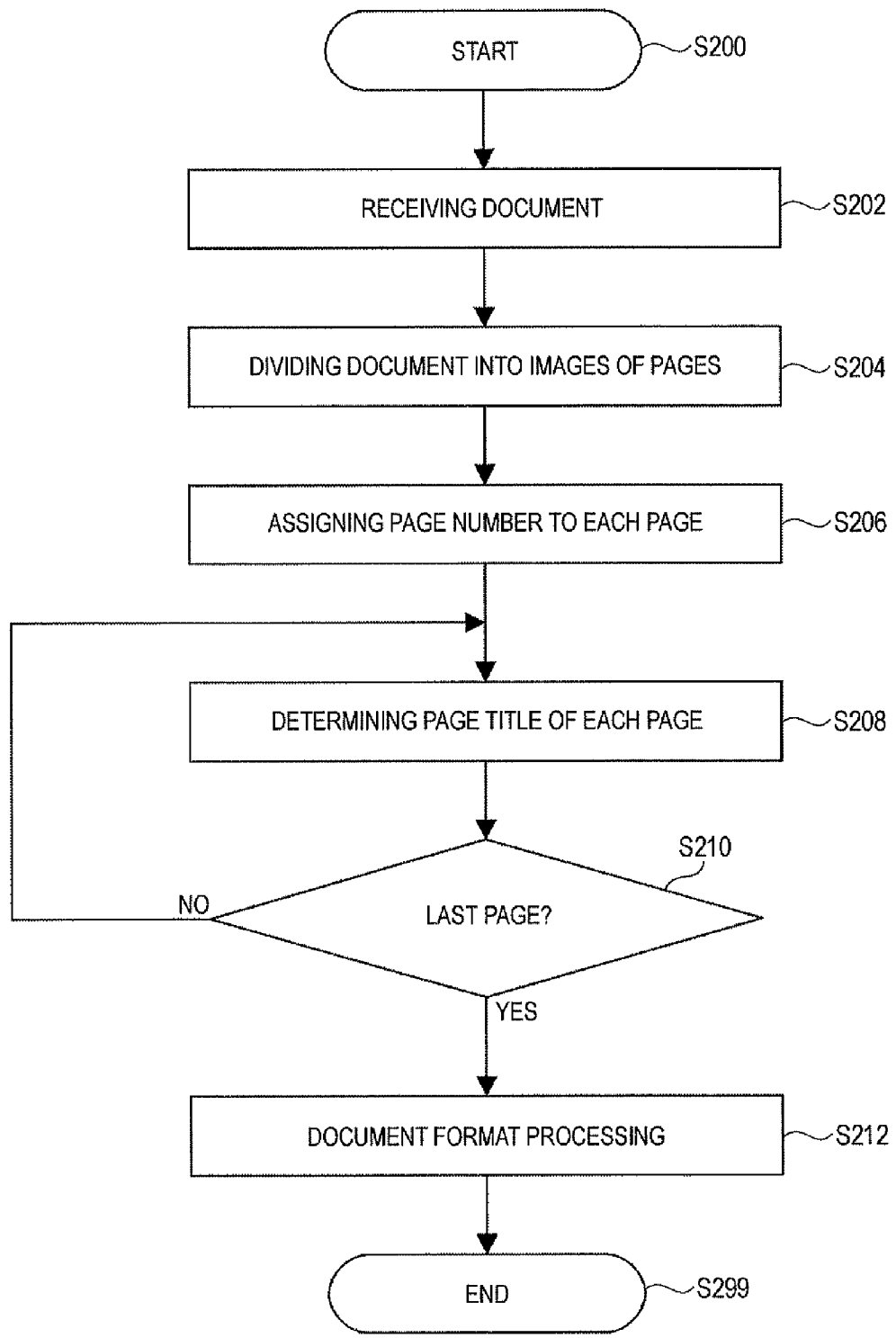

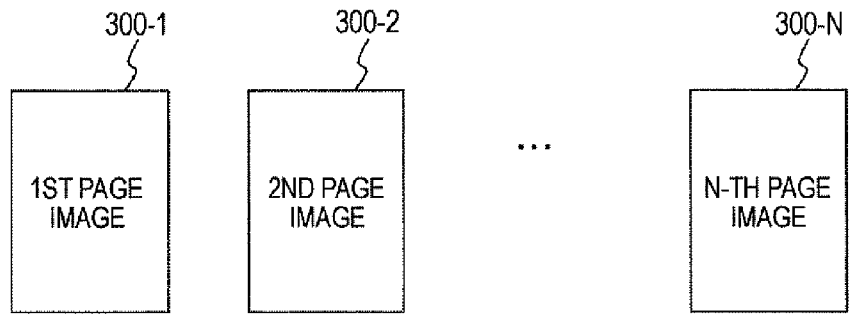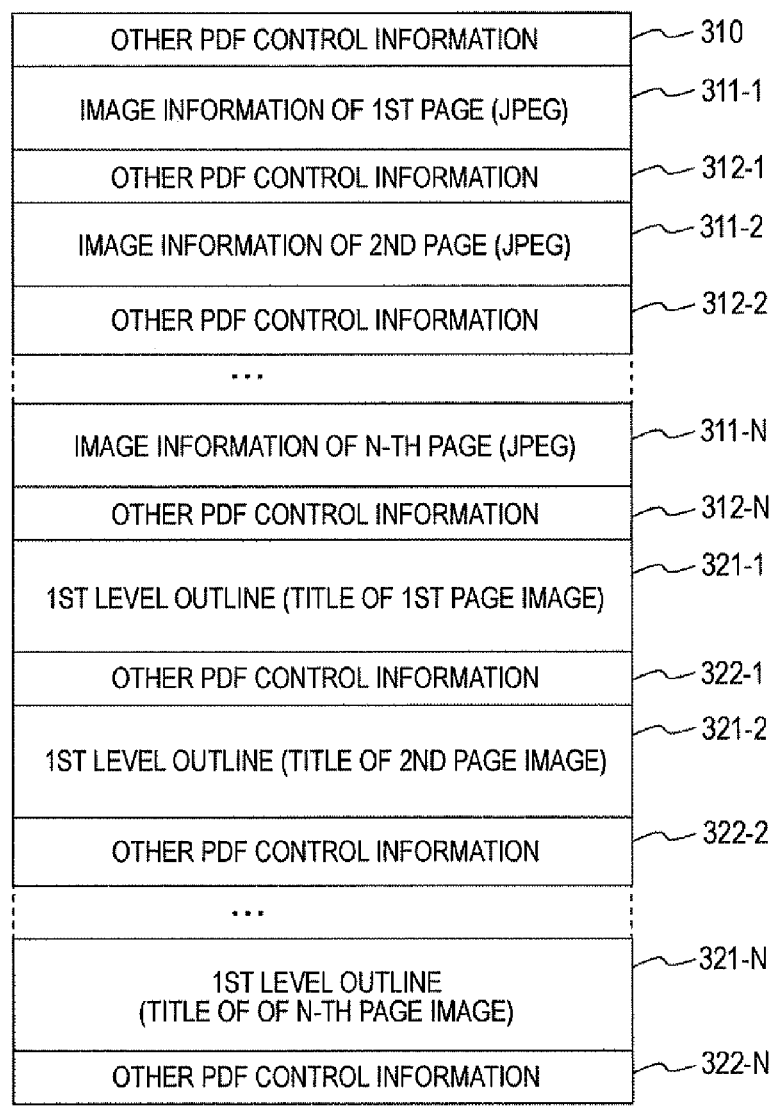

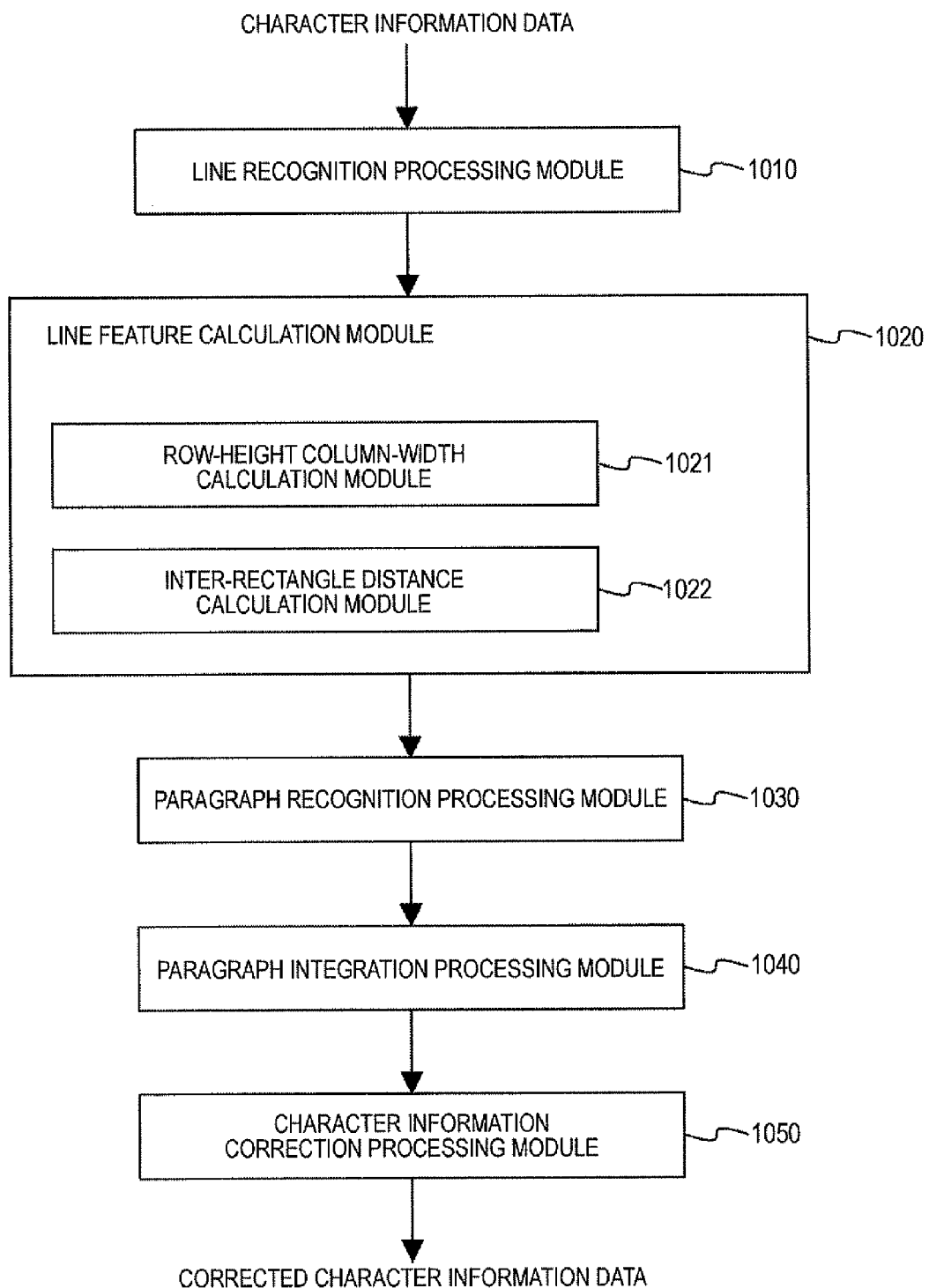

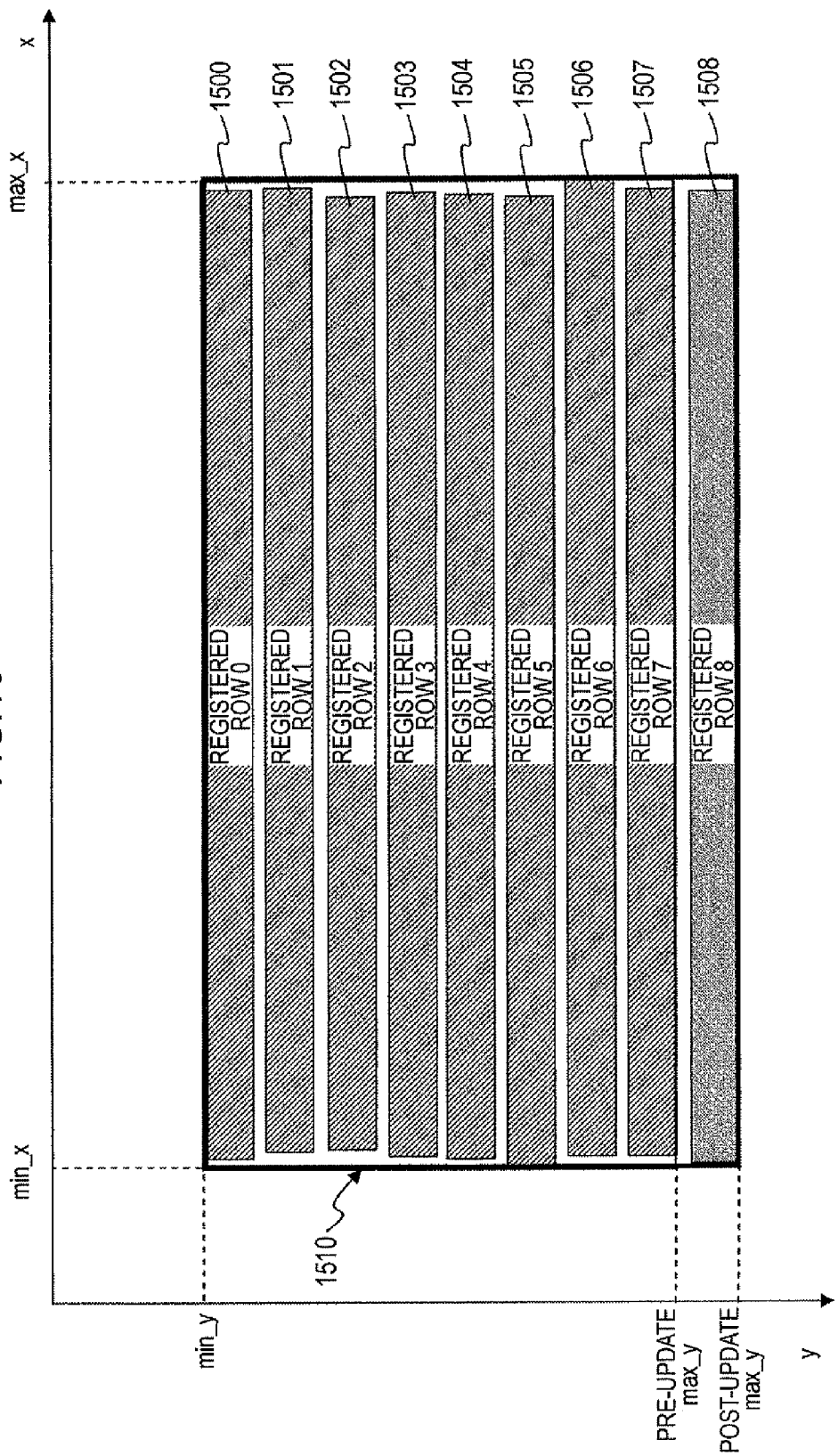

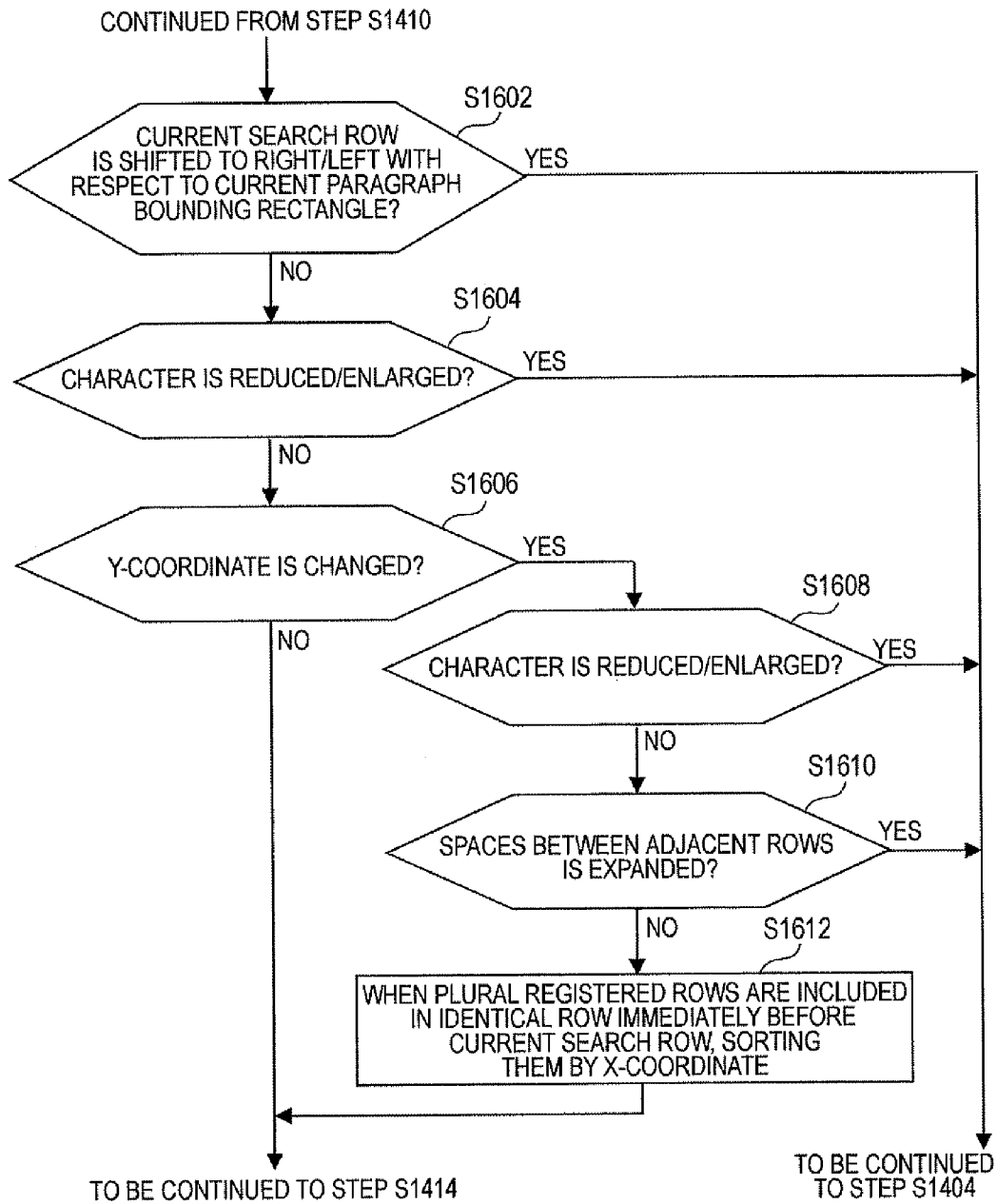

| TITLE | HIERARCHICAL LEVEL NUMBER |
|---|---|
| PAGE TITLE OF PAGE 1 | 1 |
| TITLE OF PARAGRAPH 1 | 3 |
| TITLE OF PARAGRAPH 2 | 3 |
| TITLE OF PARAGRAPH 3 | 3 |
| PAGE TITLE OF PAGE 2 | 3 |
| TITLE OF PARAGRAPH 1 | 3 |
| TITLE OF SUB-PARAGRAPH 1 | 4 |
| TITLE OF PARAGRAPH 2 | 3 |
| PAGE TITLE OF PAGE 3 | 2 |
| TITLE OF PARAGRAPH 1 | 3 |
| TITLE OF PARAGRAPH 2 | 3 |
| TITLE OF PARAGRAPH 3 | 3 |

FIG.30

| HIERARCHICAL LEVEL NUMBER | ATTRIBUTE VALUE |
|---|---|
| HIERARCHICAL LEVEL 1 | 20 |
| HIERARCHICAL LEVEL 2 | 12 |
| HIERARCHICAL LEVEL 3 | 10 |

FIG.31

| HIERARCHICAL LEVEL NUMBER | ATTRIBUTE VALUE |
|---|---|
| HIERARCHICAL LEVEL 1 | 20 |
| HIERARCHICAL LEVEL 2 | 18 |
| HIERARCHICAL LEVEL 3 | 12 |
| HIERARCHICAL LEVEL 4 | 10 |

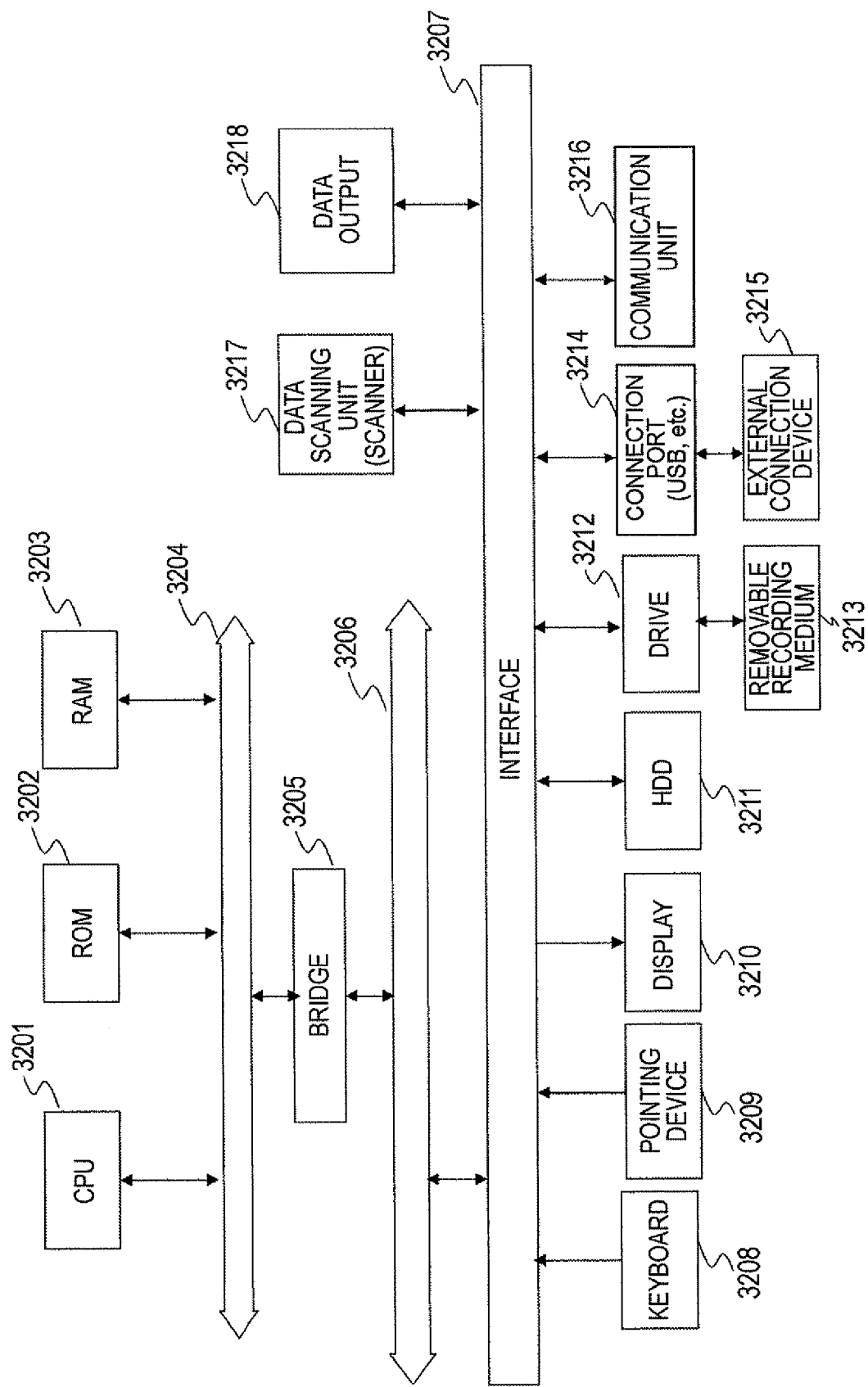

INFORMATION PROCESSING DEVICE, COMPUTER READABLE MEDIUM STORING INFORMATION PROCESSING PROGRAM, AND INFORMATION PROCESSING METHOD

CROSS-REFERENCE TO RELATED APPLICATIONS

This application is based on and claims priority under 35 USC 119 from Japanese Patent Application Nos. 2009-190890 filed Aug. 20, 2009 and 2009-275746 filed Dec. 3, 2009.

BACKGROUND

Technical Field

The present invention relates to an information processing device, a computer readable medium storing an information processing program, and an information processing method.

SUMMARY

According to an aspect of the invention, there is provided an information processing device including: a document receiving unit that receives a document containing at least one page, wherein positions of document components of a page of the at least one page are fixed within the page; a page dividing unit that divides the document received by the document receiving unit into at least one page; a page heading determining unit that determines a heading of a page of the at least one page divided by the page dividing unit based on components included in the page; and a processing unit that assigns the heading determined by the page heading determining unit to the page divided by the page dividing unit as first level outline information of the page.

BRIEF DESCRIPTION OF THE DRAWINGS

Exemplary embodiments of the present invention will be described in detail based on the following figures, wherein:

FIG. 2 is a flowchart showing an example processing according to the first exemplary embodiment;

FIG. 3 is an explanatory diagram showing a document processed by a page processing module according to the first exemplary embodiment and an exemplary format of an output document by a document format processing module;

FIG. 10 is a schematic module configuration diagram of an exemplary configuration of a paragraph division processing module according to the third exemplary embodiment;

FIG. 15 is an explanatory diagram showing an exemplary processing of updating paragraph information;

FIG. 16 is a flowchart showing an exemplary paragraph registration enabling/disabling processing according to the third exemplary embodiment;

FIG. 30 is an explanatory diagram showing an exemplary data structure of the hierarchy-attribute table;

FIG. 31 is an explanatory diagram showing an exemplary data structure of the hierarchy-attribute table; and FIG. 32 is a block diagram showing an exemplary hardware configuration of a computer implementing the first to fifth exemplary embodiments.

DETAILED DESCRIPTION

Various exemplary embodiments of the present invention will be hereinafter described based on attached figures.

<First Exemplary Embodiment>

Figure 1:
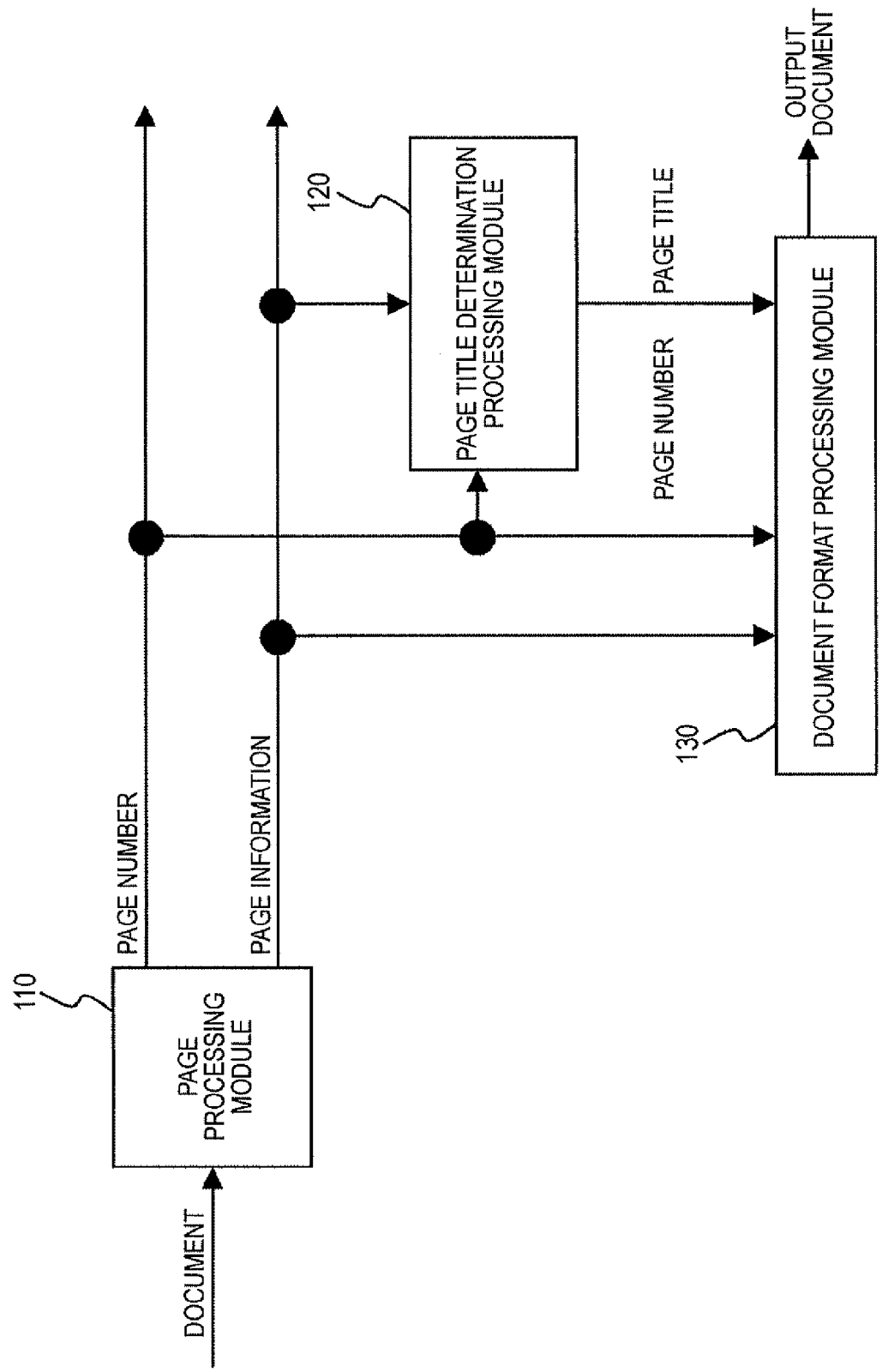
FIG. 1 is a schematic module configuration diagram of an example configuration according to a first exemplary embodiment.

FIG. 1 shows a schematic module configuration diagram of an exemplary configuration according to a first exemplary embodiment.

The term "module" herein generally refers to logically separable software (computer program) and components such as hardware. Therefore, modules in the present exemplary embodiment refer not only modules in a computer program but also modules in a hardware configuration. Therefore, through the present exemplary embodiment, a computer program, a system and a method are described. For convenience of explanation, terms "store (information)", "cause (something) to store (information)" and equivalence thereto are herein used. When an exemplary embodiment relates to a computer program, the terms mean "cause a storage device to store (information)" or "control a storage device for causing it to store (information)". Further, modules and functions may be associated on a one-to-one basis. In the actual implementation, however, a module may be formed by a program or plural modules may be formed by a program. On the contrary, a module may be formed by plural programs. Further, plural modules may be run by a computer. Alternatively, a module may be run by plural computers in the distributed computer environment or the parallel computer environment. Further, a module may include another module. Note the term "connection" hereinafter refers to not only physical connection but also logical connection (data transfer, instruction, inter-data reference relation, etc.).

Further, the term "system/device" refer to not only the one that plural components (e.g., computers, hardware, devices, etc.) are connected through a communication tool such as a network (including a one-to-one communication connection), but also the one implemented by a component (e.g., computer, hardware, device, etc). The terms "device" and "system" are herein used as synonyms. The term "preliminarily set (or predetermined)" means something has been already set before an object processing step is performed. Therefore, the term "preliminarily set (or predetermined)" is used for expressing that something is set depending on the present condition and state or the past condition and state not only before but also after a series of processing of the present exemplary embodiment is started as long as something is set before an object processing step is performed.

An information processing device according to the present exemplary embodiment receives a document that positions of document components are fixed within a page and produces an outline of the document. As shown in an example of FIG. 1, the information processing device includes a page processing module 110, a page title determination processing module 120, and a document format processing module 130.

The outline will be herein described.

The foregoing well-known arts described in Related Art are configured to search an object document from plural documents.

On the other hand, the word processors and the software for displaying a document such as PDF (Portable Document Format; registered trademark) have a function called "outline" or "bookmark" (hereinafter referred to as an outline function). The outline function is not a function of searching an object document from plural documents, but a function of searching a desired location in single or plural pages included in a document.

The outline function is a function of displaying a tree-structured chapter structure (hereinafter referred to as an outline). The outline is a type of format for managing a document as "cluster" of pages or paragraphs (including parts, chapters, sections, paragraphs, etc.). The outline is used for displaying a document, executing search within the document and the like. Although depending on software, hypertexts are generally used as texts of paragraphs in the outline. Therefore, when a text of a paragraph (e.g., paragraph heading) in the outline is clicked, a body of the paragraph corresponding to the text is configured to be displayed. The outline function thus described is mainly used for browsing a document. Parts, chapters, sections, paragraphs and the like are only examples forming the tree structure. Therefore, parts may not be positioned in the highest level of the tree structure. For example, chapters or sections may be positioned therein.

The document may be the text data. In some cases, the document may be the electronic data (e.g., image, movie, audio, etc). Alternatively, the document may be a combination of the above. The document can be an object for storage, edit, search, etc., which can be exchanged as an individual unit among systems or users. Further, the document includes one similar to the above.

Next, "a document that positions of document components are fixed within a page" will be described.

In general, the word processors and the like have only a text code string as an object in editing (although they may further have various edit information). Therefore, they have no concept of a fixed page such as a page printed onto a sheet. After completing the edit, the word processors and the like finally allocate texts and diagrams in each page. For example, when texts are input in the word processors and then a final sheet size is changed, the page content is accordingly changed. In other words, the document of the case is "a document that positions of document components are changed within a page."

In the PostScript document, the PDF document, etc., on the other hand, contents are independently described in the respective pages and are not thereby changed. In other words, a document of this case is "a document that positions of document components are fixed within a page". More specifically, this is a type of document that a document component described in an arbitrary page is not moved to another page by editing the document (especially, a type of edit that a character string is added, etc.). The page content is not changed not only in the PostScript document and the PDF document but also in a type of document including single or plural image data. The term "image data" herein refers to the raster image data having a format such as TIFF (Tagged Image File Format), JPEG (Joint Photographic Experts Group), and GIF (Graphic Interchange Format). In this case, a sheet of image can be set as a page. The document that the page content is not changed further includes a document having a format that plural sheets of the raster image data are included in a file (e.g., multi-page TIFF).

The page processing module 110 is connected to the page title determination processing module 120 and the document format processing module 130. The page processing module 110 receives a document that positions of document components are fixed within a page. When receiving "a document that positions of document components are changed within a page", the page processing module 110 converts it into "a document that positions of document components are fixed within a page". When receiving "a document that positions of document components are fixed within a page", the page processing module 110 is not obviously required to execute conversion. However, the page processing module 110 may be configured to convert the received document into "a document that positions of document components are fixed within a page" having a different format. In the following explanation, a multi-page TIFF document will be exemplified as a document to be received by the page processing module 110.

The page processing module 110 divides a received document into pages. For example, a received multi-page TIFF document is divided into single or plural raster images. Then, the page processing module 110 produces page numbers of the divided pages. For example, the page numbers may be assigned to the pages in the order of images. Alternatively, page numbers drawn in the images may be recognized as characters for numbering. The page numbers and the page information corresponding to the page numbers (e.g., a single-page image) are output from the page processing module 110 to the page title determination processing module 120 and the document format processing module 130. For example, as shown in FIG. 3A, a first page image 300-1, a second page image 300-2, ..., and an N-th page image 300-N are output while page numbers are assigned thereto.

The page title determination processing module 120 is connected to the page processing module 110 and the document format processing module 130. The page title determination processing module 120 determines titles of the respective pages divided by the page processing module 110 based on the components included in the respective pages. As a specific example, the page title determination processing module 120 receives a single-page image and determines a title of the image (page title). Alternatively, the page title can be determined through the known method.

The document format processing module 130 is connected to the page processing module 110 and the page title determination processing module 120. The document format processing module 130 executes a processing of assigning the page numbers produced by the page processing module 110 to the pages, while using the page titles determined by the page title determination processing module 120 as the first level outline information of the pages divided by the page processing module 110. For example, the page titles are set as a first level of the tree structure ("parts" in the foregoing example), and the document is converted into a PDF document in accordance with page numbers.

More specifically, for example, the document format processing module 130 receives the page numbers and the page titles respectively from the page processing module 110 and the page title determination processing module 120, and assigns the meta information, in which the page titles are set as the first level outline, to the document format while using the page numbers and the page titles. At the same time as this, the document format processing module 130 receives the page information (single-page image) from the page processing module 110, and executes a processing of converting the image into an output document format.

For example, PDF is herein set as the output document format. When PDF is used, a document of plural pages can be produced. Then, the content of each page can be stored as a JPEG image format. Further, the PDF can include the outline information independently from the image information as an outline function. FIG. 3B shows an example case that PDF is set as the output document format. As exemplified in FIG. 3B, as the output document format, the PDF control information of the entire document (document of N pages) is set in the head of the format. Further, plural pairs of the image information (e.g., JPEG) 311 and the other PDF control information 312 (PDF control information of each page) are set for the first to N-th pages in the following positions after the PDF control information 310. Yet further, plural pairs of the first level outline 321 that stores a title of each page and the other PDF control information 322 regarding the outline are set for the first to N-th pages in the following positions after the pairs of the image information 311 and the other PDF control information 312.

FIG. 2 is a flowchart showing an exemplary processing according to the first exemplary embodiment.

In Step S202, the page processing module 110 receives a document.

In Step S204, the page processing module 110 divides the document into images of pages.

In Step S206, the page processing module 110 assigns page numbers to the pages, respectively.

In Step S208, the page title determination processing module 120 determines page titles for the pages, respectively.

In Step S210, the page title determination processing module 120 determines whether or not a page title is determined for the last page. If a title is determined for the last page, the processing proceeds to Step S212. Otherwise, the processing returns to Step S208.

In Step S212, the document format processing module 130 executes a document format processing and outputs the formatted document after a title is determined for the last page.

Figure 4:
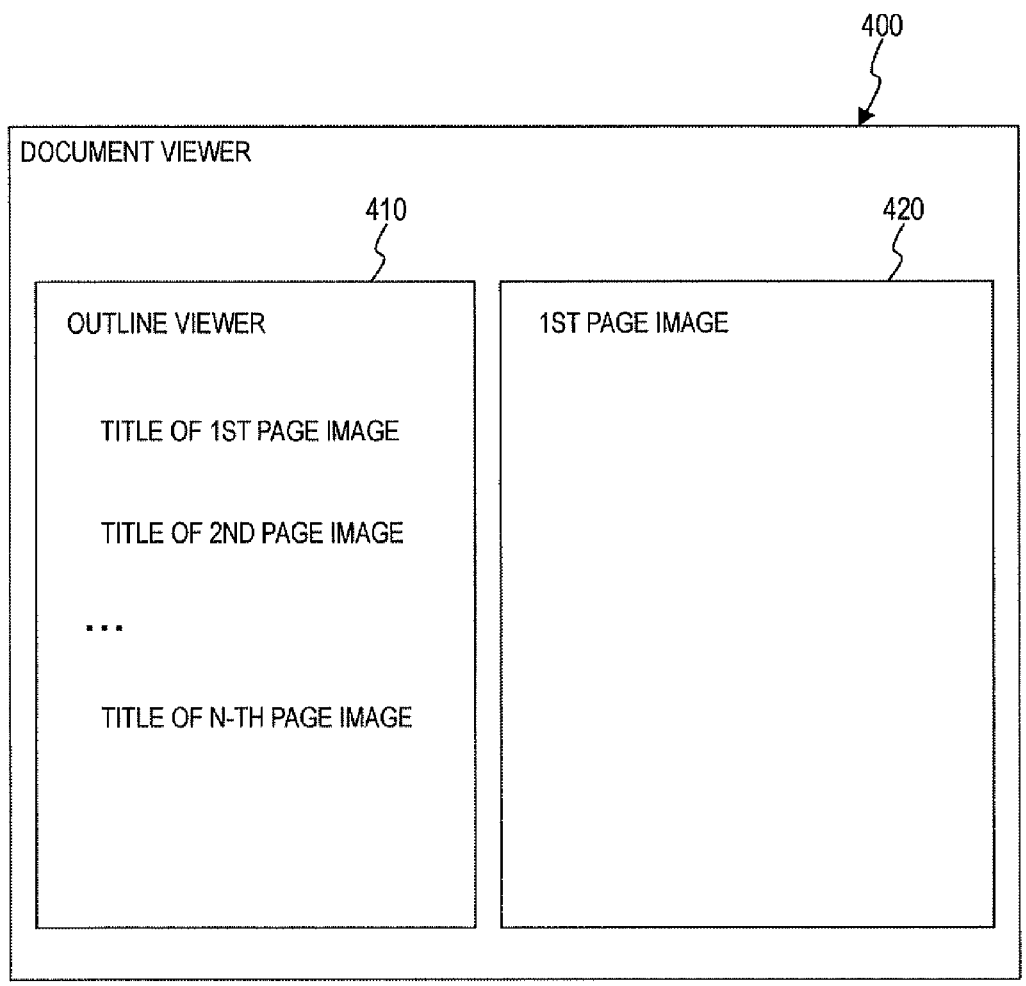
FIG. 4 is an explanatory diagram showing a display example of the output document according to the first exemplary embodiment.

The document thus produced is displayed using a document viewer suitable for the format, as exemplified in FIG. 4.

The document viewer displays an outline viewer display area 410 and a page image display area 420 within a document viewer display area 400. In the document viewer, an image of each page is displayed in the page image display area 420. Further, the document viewer optionally has an outline viewer. When the outline viewer is opened, titles of pages are displayed in the outline viewer display area 410. When a text (page title) displayed in the outline viewer display area 410 is selected by a user's operation (e.g., click), an image of a page, currently displayed in the page image display area 420, is changed to a page image corresponding to the selected page title. In short, the foregoing processing can be executed by setting the page titles as the first level outline.

<Second Exemplary Embodiment>

In the above first exemplary embodiment, the well-known arts have been used for determining the page titles. However, the above well-known arts relate to methods of obtaining the document titles. Therefore, they may not be necessarily suitable for obtaining the page titles.

In response to this, a method suitable for obtaining the page titles will be described in the present exemplary embodiment.

Figure 5:
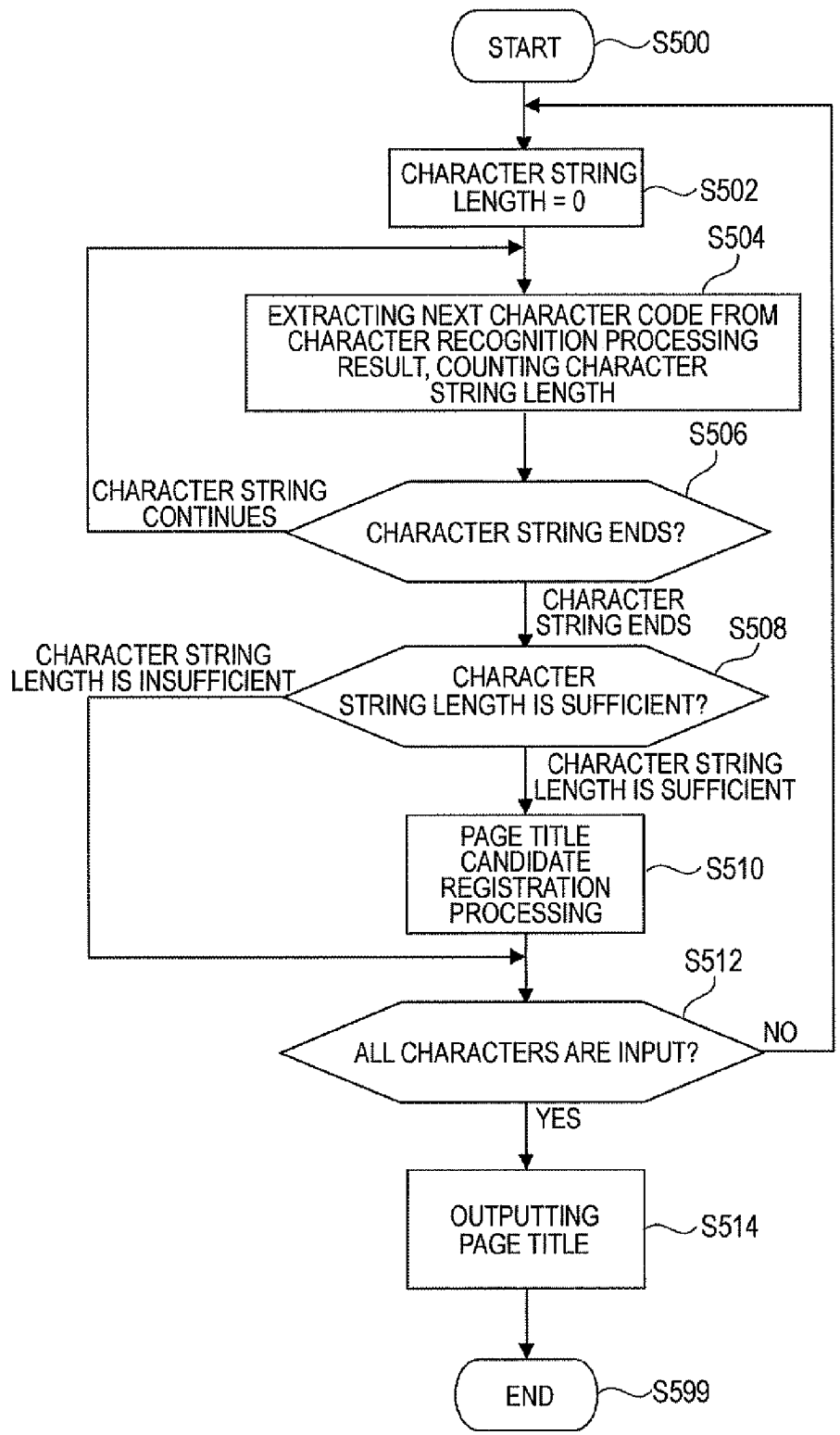
FIG. 5 is a flowchart showing an exemplary processing according to a second exemplary embodiment.

FIG. 5 is a flowchart showing an exemplary processing by the page title determination processing module 120 according to the second exemplary embodiment. Note FIG. 5 shows an exemplary case that a document to be received by the page processing module 110 is mainly an image and page titles are also character images. Further, the page title determination processing module 120 includes a character recognition module. The character recognition module recognizes characters included in the character images within the document.

Before the processing is executed, the character recognition module recognizes the character images within the document. The processing is executed for each page. When the document includes plural pages, the processing is executed by the number of times corresponding to the number of pages. As a result of character recognition, character codes are obtained while being sequentially arranged. In Step S504, the character codes are sequentially extracted. When the characters are horizontally arranged, the character codes are extracted in the left-to-right order. On the other hand, when the characters are vertically arranged, the character codes are extracted in the up-to-down order. It is determined whether the characters are arranged horizontally or vertically through the document image analysis.

In Step S502, a variable of the character string length of a page title is set to be "0".

In Step S504, a character code of the next single character (i.e., an object character code) is extracted from the result of the character recognition processing. To count the character string length, "1" is added to the variable of the character string length.

In Step S506, it is determined whether or not the character string obtained as a result of the character recognition processing ends. If the character string ends, the processing proceeds to Step S508. Otherwise, the processing returns to Step S504.

For example, the following methods are used for determining whether or not the character string ends.

(A) Character code obtained as a result of recognition.
(A1) It is determined that a character string ends when a linefeed code ("CR (Carriage Return)", "LF (Line Feed)", etc.) is detected.
(A2) It is determined that a character string ends when a punctuation mark (", (comma in Japanese language)", ". (period in Japanese language)", etc.) is detected.
(B) A position of a character image (the term "character image" herein refers to a character image corresponding to single recognition result of character recognition, which is so-called a character image of single character).

It is determined that a character string ends when a relative position between a current character and the next character is greater than a preliminarily set threshold. It is determined that "the relative position is large" based on a difference between a position of the current character and that of the next character in the horizontal direction or the vertical direction. Alternatively, it may be determined that "the relative position is large" based on a difference between a position of the current character and that of the next character in the horizontal direction and that in the vertical direction. This deals with a case that a page title is expressed in a different position from the other characters (e.g., the page title is shifted to the leftward from the other characters). In this case, the character recognition module outputs not only character codes but also character positions as a result of character recognition.

(C) Color of Character Image

It is determined that a character string ends when difference between color of a current character and that of the next character is greater than a preliminarily set threshold. This deals with a case that a page title is expressed with a color different from that of the other characters. In this case, Euclidean distance in RGB three-dimensional space, Euclidean distance in YCbCr space, or distance obtained by other color difference calculation methods may be used for "color difference". In this case, the character recognition module outputs not only character codes but also character colors as a result of character recognition.

(D) Size of Character Image

It is determined that a character string ends when a relative difference between size of a current character and that of the next character is greater than a preliminarily set threshold. This deals with a case that a page title is expressed in a different size from the other characters. In this case, the character recognition module outputs not only character codes but also character sizes (e.g., the number of horizontal and vertical pixels, and point size) as a result of character recognition.

In Step S508, it is determined whether or not a character string length is sufficient. When the character string length is sufficient, the processing proceeds to Step S510. Otherwise, the processing proceeds to Step S512. Determination of whether or not the character string is sufficient means determination of whether or not a variable of the character string length is greater than or equal to a preliminarily set threshold.

In Step S510, a page title candidate registration processing is executed.

If no page title candidate has been registered (if Step S510 is executed for a current page for the first time), a page title candidate is unconditionally registered. On the other hand, if a page title candidate has been already registered, it is determined which of the registered candidate and the newly extracted candidate is suitable as a page title. Then, the one which is more suitable as a page title is registered.

For example, the following method is used for executing the above.

A new candidate is registered as a page title candidate only when character size of the new candidate is greater than that of a registered candidate by $\alpha$ times or greater. Here, "$\alpha$" is a preliminarily set threshold. For example, a numerical value is set for $\alpha$ ($\alpha=1.5$, etc).

Alternatively, marks (e.g., comma), having high chances of appearing when the character recognition is failed, may be preliminarily registered, and a processing of preventing registration of a character string may be executed when a rate of the marks appearing in the character string is greater than a threshold.

Alternatively, a new candidate may be registered when characters of the new candidate are positioned within a preliminarily set positional range (e.g., when characters of the new candidate are horizontally arranged and are positioned above a preliminarily set position, when characters of the new candidate are vertically arranged and are shifted to the rightward from a preliminarily set position, etc.).

Alternatively, the new candidate may be registered when a color of characters of the new candidate falls in a preliminarily set color range (e.g., a color excluding black, a preliminarily set color, etc.).

Determination may be executed using a combination of the above methods. For example, determination may be executed using the size and the position of the characters of the new candidate.

In Step S512, it is determined whether or not all the characters (character recognition result in a current page) have been already input. If all the characters have been already input, the processing proceeds to Step S514. Otherwise, the processing returns to Step S502.

In Step S514, the page title having registered in Step S510 is output. When no page title has been registered in this phase, a blank character string may be output, for instance.

<Third Exemplary Embodiment>

In the foregoing exemplary embodiments, the first level outline information is provided. In the third exemplary embodiment, however, a page may be further divided into paragraphs and the second level outline information may be extracted and provided. For example, the second level outline information refers to the foregoing level "chapter". In the third exemplary embodiment, titles of paragraphs correspond thereto.

Figure 6:
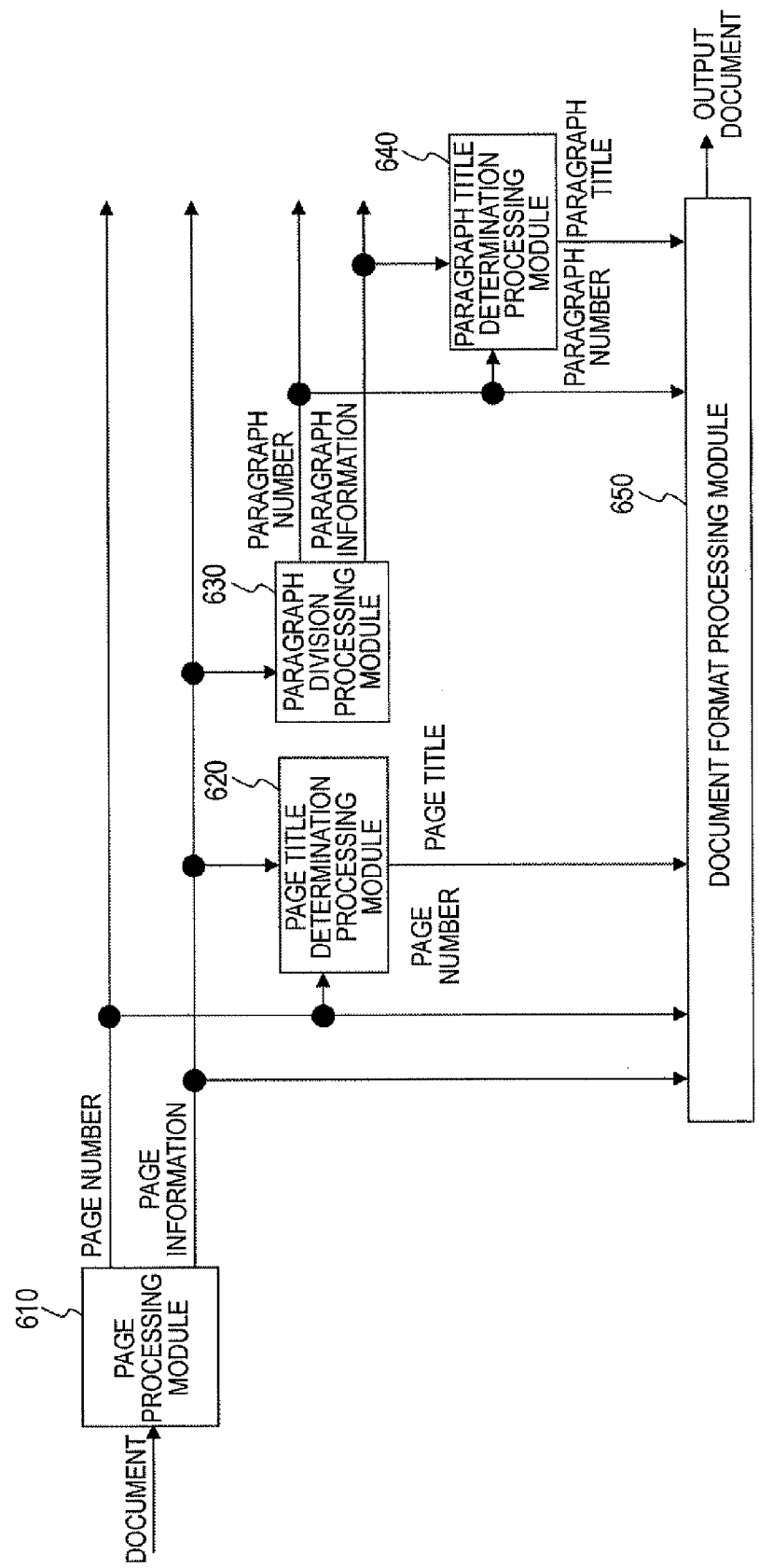
FIG. 6 is a schematic module configuration diagram of an exemplary configuration according to a third exemplary embodiment.

FIG. 6 is a schematic module configuration diagram of an exemplary configuration according to the third exemplary embodiment. Some of the modules are equivalent to those of the first and second exemplary embodiments exemplified in FIG. 1. Therefore, detailed description of the equivalent modules will be hereinafter omitted for avoiding repetitive description, and only their equivalence will be simply mentioned.

As shown in an example of FIG. 6, the third exemplary embodiment includes a page processing module 610, a page title determination processing module 620, a paragraph division processing module 630, a paragraph title determination processing module 640, and a document format processing module 650.

The page processing module 610 is connected to the page title determination processing module 620, the paragraph division processing module 630, and the document format processing module 650. The page processing module 610 is equivalent to the page processing module 110 exemplified in FIG. 1. However, the page processing module 610 transfers the page information not only to the page title determination processing module 620 and the document format processing module 650 but also to the paragraph division processing module 630.

The page title determination processing module 620 is connected to the page processing module 610 and the document format processing module 650. The page title determination processing module 620 is equivalent to the page title determination processing module 120 exemplified in FIG. 1.

The paragraph division processing module 630 is connected to the page processing module 610, the paragraph title determination processing module 640, and the document format processing module 650. The paragraph division processing module 630 receives the page information from the page processing module 610, divides the page into paragraphs, and produces paragraph numbers for the divided paragraphs. The paragraph division processing module 630 then transfers the paragraph numbers to the paragraph title determination processing module 640 and the document format processing module 650, and transfers paragraph information (e.g., images of the divided paragraphs within a page) to the paragraph title determination processing module 640.

A module configuration within the paragraph division processing module 630 and the processing content thereof will be described with reference to FIGS. 10 to 21.

FIG. 10 is a schematic module configuration diagram of an exemplary configuration of the paragraph division processing module 630 according to the third exemplary embodiment.

A row/column is hereinafter referred to as a line. Additionally, the following description mainly relates to a case applied to a horizontally described document. Therefore, in the following description, height of a row is mainly exemplified as either height of a row in a horizontally described document or width of a column in a vertically described document.

Further, a pixel cluster at least includes a pixel area including 4 or 8 pixels consecutively connected, and also includes a group of pixel areas. The group of pixel areas refers to a group of plural pixel areas disposed in the vicinity of each other, each of which includes consecutively connected pixels (e.g., 4 pixels consecutively connected). The pixel areas disposed in the vicinity of each other herein refer to, for instance, pixel areas close to each other in distance, pixel images that are projected in a vertical or horizontal direction for cutting out characters from a row as a text one by one and are then cut out at a blank point or at a preliminarily set interval, etc. For example, a character recognition processing is executed, and an image recognized as a character through the processing may be set as a pixel cluster.

Note an image of single character is often set as a pixel cluster. In the present exemplary embodiment, the pixel cluster is also referred to as a character or a character image.

As exemplified in FIG. 10, the present exemplary embodiment includes a line recognition processing module 1010, a line feature calculation module 1020, a paragraph recognition processing module 1030, a paragraph integration processing module 1040, and a character information correction processing module 1050.

The line recognition processing module 1010 is connected to the line feature calculation module 1020, extracts a line (i.e., a row/column) within a document using the character information data, and transfers the information of the extracted line to the line feature calculation module 1020.

The line recognition processing module 1010 will be described in more detail.

The line recognition processing module 1010 receives the character information data. The character information data herein refers to data produced by the paragraph division processing module 630 using the page information received from the page processing module 610. The character information data at least includes information of rectangles of pixel clusters within the document. For example, the rectangle information may be the character bounding rectangle information (i.e., coordinate values within the document (which may be either absolute coordinate values or relative coordinate values)) or the font information (character shape information). Further, the character information data may include the information of a recognition order of characters corresponding to a pixel cluster (numbers ordered in the recognition order by the character recognition module). The following information are exemplary character information data: coordinates of characters in the document (e.g., an upper left coordinate of a bounding rectangle surrounding characters); size of a bounding rectangle indicating size of characters (width, height of a bounding rectangle); shape of characters; codes of characters; character order information; and the information indicating whether characters are vertically arranged or horizontally arranged. In the present exemplary embodiment, a case is described that the line recognition processing module 1010 receives the foregoing character information data from the character recognition module. However, the line recognition processing module 1010 does not necessarily receive the foregoing data from the character recognition module. Alternatively, the line recognition processing module 1010 may receive a bounding rectangle of characters and may produce the character information data equivalent to the above.

Next, the line recognition processing module 1010 extracts lines within the document based on the character information data that it received. For example, when the document is horizontally described, the line recognition processing module 1010 extracts height of each row that is a line including a bounding rectangle while using a height directional position of the bounding rectangle (i.e., y-coordinate). On the other hand, when the document is vertically described, the line recognition processing module 1010 extracts width of each column that is a line including abounding rectangle while using a width directional position of the bounding rectangle (i.e., x-coordinate). As more detailed examples, FIGS. 11 and 12 show an exemplary method of extracting rows.

FIG. 11 shows an exemplary method that the line recognition processing module 1010 recognizes rows based on coordinate values of bounding rectangles.

Figure 11B:
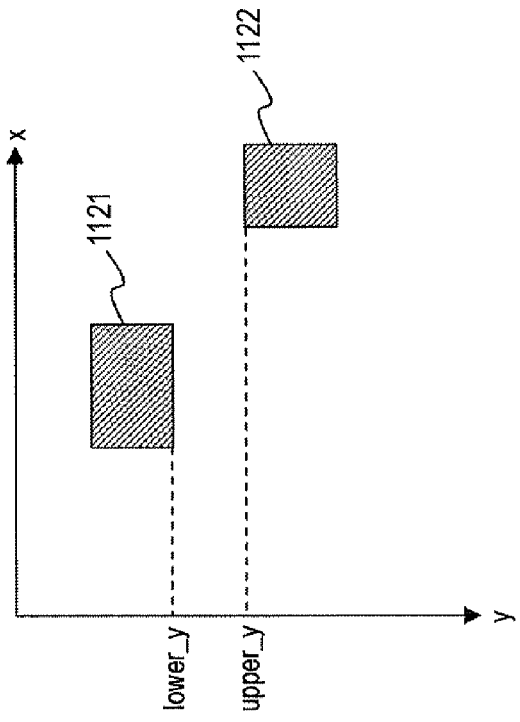
FIG. 11 is an explanatory diagram showing an exemplary line extraction processing by a line recognition processing module.
Figure 11A:
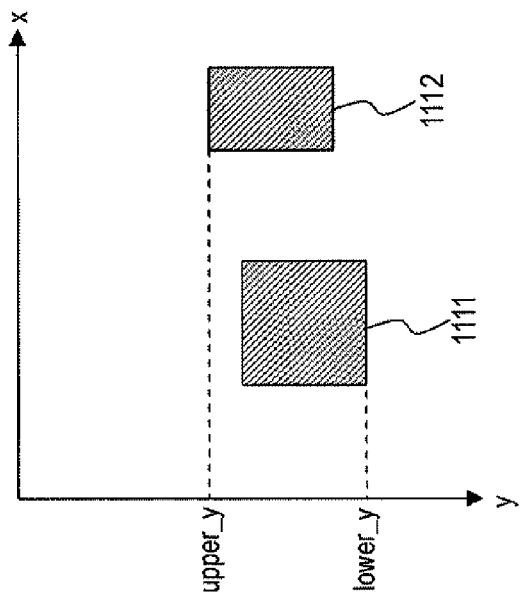

As shown in an example of FIG. 11A, when an upper left y-coordinate (upper_y) of a bounding rectangle (focused bounding rectangle 1112) of the focused character information data is less than a lower left y-coordinate (lower_y) of a bounding rectangle (focused bounding rectangle 1111) of the immediately previous character information data (i.e., upper_y<lower_y), the line recognition processing module 1010 recognizes that the bounding rectangle (focused bounding rectangle 1112) of the focused character information data is in the same row as the focused bounding rectangle 1111. In the coordinate system, the origin (0, 0) is set in the upper left position, and a value of x-coordinate increases to the rightward whereas a value of y-coordinate increases to the downward.

Further, as shown in an example of FIG. 11B, when an upper left y-coordinate (upper_y) of a bounding rectangle (focused bounding rectangle 1122) of the focused character information data is greater than a lower left y-coordinate (lower_y) of abounding rectangle (focused bounding rectangle 1121) of the immediately previous character information data (i.e., lower_y<upper_y), two rows are recognized to be different from each other.

Then, the line recognition processing module 1010 transfers columns of the character information data recognized to be disposed in the identical line to the line feature calculation module 1020.

Note the received character information data are arranged in the order that the bounding rectangles of the character images appear (e.g., when the document is horizontally described, the character information data are arranged in the top row in the order that the bounding rectangles are scanned from left to right, and the character information data are similarly arranged in the next row in the order that the bounding rectangles are scanned from left to right). Therefore, a bounding rectangle of the character information data immediately previous from the current character information appears immediately before a bounding rectangle of the current character information appears. Further, the bounding rectangles may be sorted by their upper left coordinates.

FIG. 12 shows an exemplary method that the line recognition processing module 1010 recognizes rows based on distance between bounding rectangles.

Figure 12A:
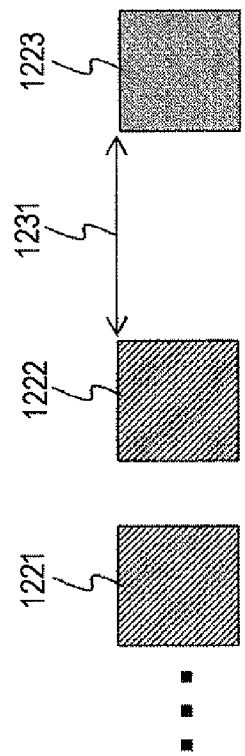
FIG. 12 is an explanatory diagram showing an exemplary line extraction processing by the line recognition processing module.

As shown in an example of FIG. 12A, when inter-bounding rectangle distance 1211 (also hereinafter referred to as current inter-bounding rectangle distance) between a bounding rectangle of the focused character information data (i.e., focused bounding rectangle 1203) and a bounding rectangle of the immediately previous character information data (i.e., bounding rectangle 1202) is less than or equal to a value obtained by multiplying average of distances between bounding rectangles that have been already recognized to be disposed in the identical row (also hereinafter referred to as average inter-bounding rectangle distance) by α in a currently processed row (i.e., the following relation is satisfied: current inter-bounding rectangle distance≤average inter-bounding rectangle distance×α), the line recognition processing module 1010 recognizes that the focused bounding rectangle 1203 is disposed in the same row as the bounding rectangle 1202. Note "α" is a line recognition parameter to which a preliminarily set value is given. For example, "α" is set in accordance with the character information data.

Figure 12B:
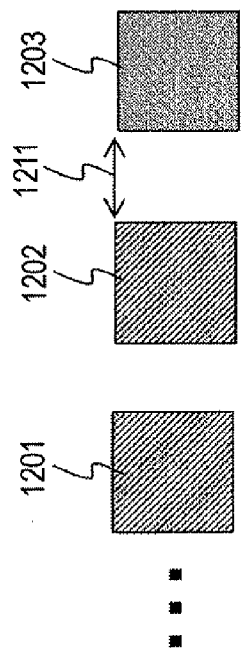

Further, as shown in an example of FIG. 12B, when inter-bounding rectangle distance 1231 between a bounding rectangle of the focused character information data (i.e., focused bounding rectangle 1223) and a bounding rectangle of the immediately previous character information data (i.e., bounding rectangle 1222) is greater than a value obtained by multiplying average inter-bounding rectangle distance in a currently processed row by α (i.e., current inter-bounding rectangle distance>average inter-bounding rectangle distance×α), the line recognition processing module 1010 recognizes that the focused bounding rectangle 1223 is disposed in a different row from the bounding rectangle 1222.

The line feature calculation module 1020 is connected to the line recognition processing module 1010 and the paragraph recognition processing module 1030. The line feature calculation module 1020 includes a row-height column-width calculation module 1021 and inter-rectangle distance calculation module 1022. The line feature calculation module 1020 receives the character information data recognized to be disposed in the identical line by the line recognition processing module 1010, calculates features of the line, and transfers the information of the calculated line to the paragraph recognition processing module 1030. The row-height column-width calculation module 1021 calculates height of a row whereas the inter-rectangle distance calculation module 1022 calculates inter-rectangle distance.

In other words, the line feature calculation module 1020 calculates features of the line such as height of a row, width of a column, row-bounding rectangle coordinate, average inter-bounding rectangle distance, etc. from the row of the character information data recognized to be arranged in the identical row by the line recognition processing module 1010.

Figure 13:
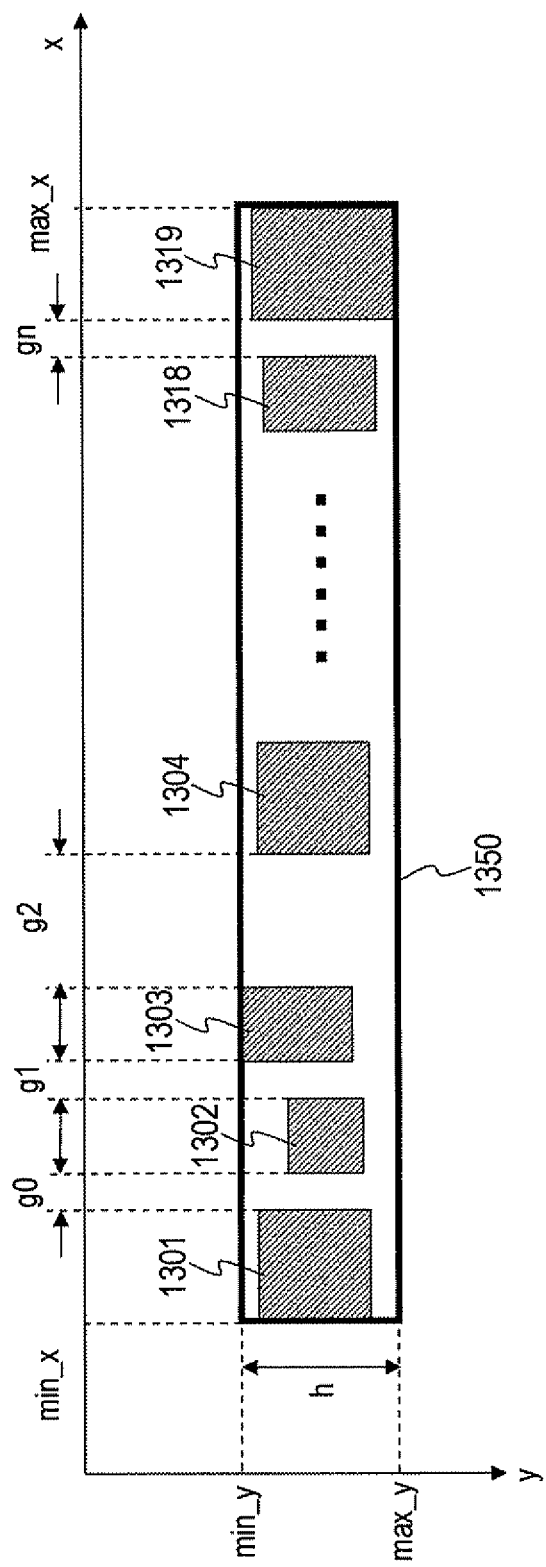
FIG. 13 is an explanatory diagram showing an exemplary line feature extraction processing by a line feature calculation module.

The line feature calculation module 1020 calculates a rectangle including bounding rectangles of the character information data included in the identical row. For example, as shown in an example of FIG. 13, the line feature calculation module 1020 calculates a row bounding rectangle 1350 surrounding bounding rectangles 1301 to 1319 disposed in the identical row. Subsequently, as shown in the example of FIG. 13, the line feature calculation module 102 calculates an upper left coordinate (min_x, min_y) and a lower right coordinate (max_x, max_y) of the row bounding rectangle as coordinates of the row bounding rectangle.

Further, the row-height column-width calculation module 1021 calculates row height (h) as "h=max_y−min_y" using the above calculated coordinates of the row bounding rectangle. Similarly, the row-height column-width calculation module 1021 calculates row width (w) as "w=max_x−min_x" using the above calculated coordinates of the row bounding rectangle. The row height and the row width are calculated using size (height, width) or a coordinate of each bounding rectangle.

Further, the inter-rectangle distance calculation module 1022 calculates average inter-character bounding rectangle distance as average of inter-bounding rectangle distances g0, g1, . . . , and gn (i.e., average of distances between adjacent character information data arranged in the identical row). Additionally, the inter-rectangle distance calculation module 1022 calculates maximum inter-bounding rectangle distance max_g as the maximum of g0, g1, . . . , and gn. Each of the values of g0, g1, . . . , and gn may be kept as the list data.

The paragraph recognition processing module 1030 is connected to the line feature calculation module 1020 and the paragraph integration processing module 1040. The paragraph recognition processing module 1030 extracts paragraphs within the document and calculates the information of the paragraphs based on the respective rows recognized by the line recognition processing module 1010 and the line feature amount calculated with respect to the respective rows by the line feature calculation module 1020. Further, when the document is horizontally described, paragraphs may be extracted using height of each row and a coordinate of the line (height-directional position (y-coordinate)) which are extracted by the line recognition processing module 1010. On the other hand, when the document is vertically described, paragraphs may be extracted using width of each column and a coordinate of the line (width-directional position (x-coordinate)) which are extracted by the line recognition processing module 1010. Alternatively, paragraphs may be extracted based on a positional relation between the line extracted by the line recognition processing module 1010 and a paragraph as a processing object. Further, the positional information of a bounding rectangle surrounding the extracted paragraph may be calculated as the information of the extracted paragraph.

Alternatively, the information of the paragraph order may be calculated from the information of the appearance order of characters included in the paragraph. Further, when the document is horizontally described and plural lines are arranged in the identical row, the lines may be ordered. On the other hand, when the document is vertically described and plural lines are arranged in the identical column, the lines may be ordered. The positional information of a bounding rectangle surrounding a paragraph includes, for instance, values in a coordinate of an upper left corner of a paragraph bounding rectangle, width of the paragraph bounding rectangle, height of the paragraph bounding rectangle, etc. Further, the paragraph recognition processing module 1030 may calculate a representative value of a paragraph recognized by it as the information of the paragraph using heights or widths of lines included in the paragraph (height of each row when the document is horizontally described, width of each column when the document is vertically described). More specifically, when the document is horizontally described, a representative value of a paragraph refers to a value of row height of a row that is the highest in the rows recognized to be included in the identical paragraph. When the document is vertically described, a representative value of a paragraph refers to a value of column width of a column that is the widest in the columns recognized to be included in the identical paragraph.

Figure 14:
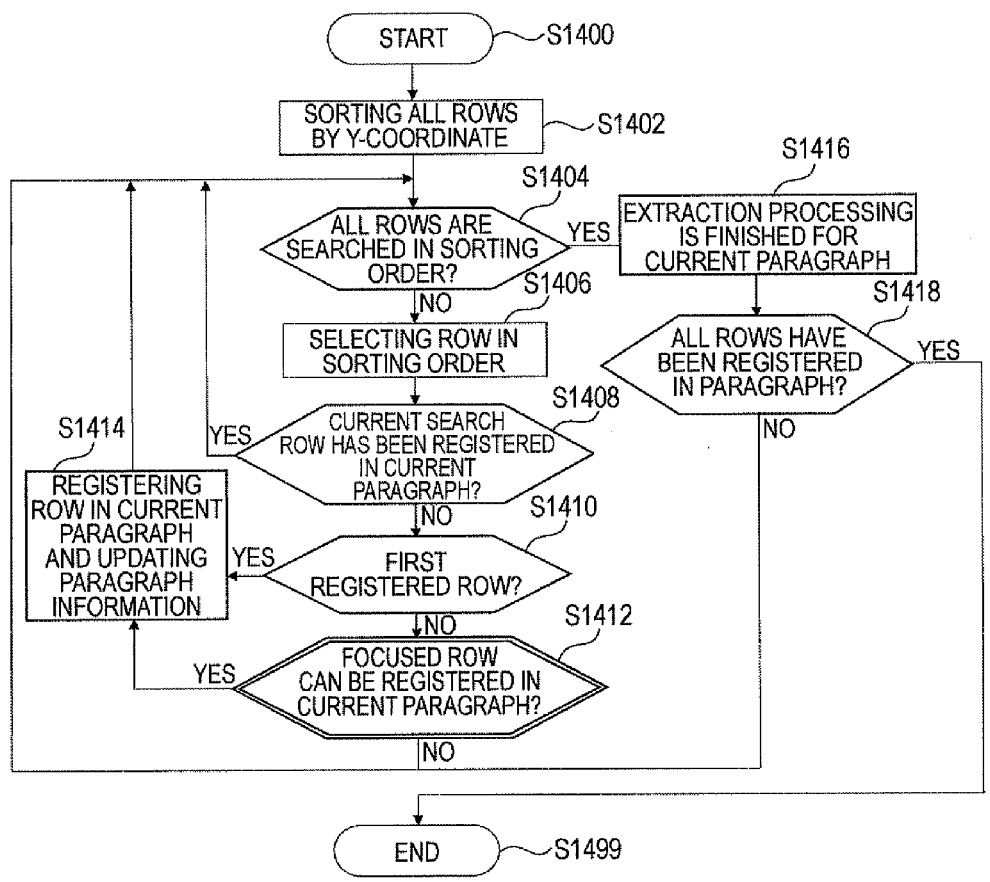
FIG. 14 is a flowchart showing a exemplary paragraph recognition processing according to the third exemplary embodiment.

FIG. 14 is a flowchart showing an exemplary processing of recognizing paragraphs according to the third exemplary embodiment. In other words, FIG. 14 shows an exemplary processing executed by the paragraph recognition processing module 1030.

In Step S1402, rows recognized by the line recognition processing module 1010 are firstly sorted in the ascending order by values min_y, which are values of y-coordinate of row bounding rectangles.

In Step S1404, it is determined whether or not all the rows sorted in Step S1402 have been searched (processing of Steps S1406 to S1414). If all the rows have been searched, the processing proceeds to Step S1416. If all the rows have not been searched yet, the processing proceeds to Step S1406.

In Step S1406, a focused row (also hereinafter referred to as current search row) is selected in the sorted order.

In Step S1408, it is determined whether or not the current search row has been registered in the paragraph. If the current search row has been registered in the paragraph, the processing returns to Step S1404. If the current search row has not been registered yet, the processing proceeds to Step S1410.

In Step S1410, it is determined whether or not the current search row is the first registered row in the current paragraph. If the current search row is the first registered row in the current paragraph, the processing proceeds to Step S1414. If the current search row is not the first registered row in the current paragraph, the processing proceeds to Step S1412.

In Step S1412, it is determined whether or not the current search row can be registered in the current paragraph. If the current search row can be registered in the current paragraph, the processing proceeds to Step S1414. If the current search row cannot be registered in the current paragraph, the processing returns to Step S1404. Note a detailed processing of allowing/preventing registration of the current search row in Step S1412 will be explained below with reference to FIG. 16.

In Step S1414, that is, when the current search row is the first registered row in the current paragraph or when the current search row can be registered in the current paragraph, the current search row determined in Step S1410 or S1412 is registered in the current paragraph and the information of the paragraph is calculated or updated. Subsequently, the processing proceeds to Step S1404.

Now, FIG. 15 shows a specific example of the paragraph information. For example, the paragraph information includes the positional information of the paragraph (e.g., upper left coordinate and lower right coordinate) and paragraph order value (order in reading the paragraph). As shown in an example of FIG. 15, the paragraph recognition processing module 1030 calculates an upper left coordinate (min_x, min_y) and a lower right coordinate (max_x, max_y) of a paragraph bounding rectangle 1510, which is set as a rectangle including row bounding rectangles of all the rows registered in a paragraph (registered row 0 1500 to registered row 8 1508) using the row information registered in the paragraph (registered row information). Although not shown in FIG. 15, a row height value of a row that is the highest in all the rows registered in the identical paragraph is calculated as max_h, and max_h is set as a paragraph representative value. Similarly, a character recognition order value of the character information data for which character recognition is executed earliest in all the character information data registered in the identical paragraph is calculated as min_order, and min_order is set as a paragraph order value.

Next, update of the paragraph information will be described. When a new row is registered in the current paragraph in the present step, the paragraph recognition processing module 1030 updates the foregoing paragraph bounding rectangle coordinate and the foregoing paragraph order value. In the specific example shown in FIG. 15, when the registered row 8 1508 is assumed to be a row as a new processing object, width of a row bounding rectangle of the registered row 8 1508 does not exceed a width range of the current paragraph bounding rectangle (i.e., coordinates min_x, max_x). Therefore, only max_y is updated without updating min_x and max_x (In FIG. 15, pre-update max_y is updated to post-update max_y). Further, a comparison is executed between the paragraph representative value of the current paragraph and row height of the registered row 8 1508 to be newly registered. When the row height of the registered row 8 1508 is greater than the paragraph representative value of the current paragraph, the paragraph representative value max_h is also updated. In other words, the row height of the registered row 8 1508 is set to be the paragraph representative value max_h, and the paragraph representative value max_h is set as the highest row height within the paragraph. Further, a comparison is executed between the current paragraph order value and character recognition order values of all the character information data in the registered row 8 1508 to be newly registered. When there exists a character recognition order value smaller than the current paragraph order value, a paragraph order value min_order is updated to the small value (character recognition order value).

All the rows have been searched in the sorted order in Step S1404. In Step S1416, it is therefore determined that rows, considered to be registered in the current paragraph, have been all registered, and the extraction processing is finished with respect to the current paragraph.

In Step S1418, it is determined whether or not all the rows have been registered in the paragraph. If all the rows have been registered in any of the paragraphs, the paragraph extraction processing is finished (Step S1499). If there left a row having not registered in any of the paragraphs, the processing returns to Step S1404 and the next paragraph extraction processing is executed.

Next, a detailed exemplary processing of allowing/preventing registration of a current search row, which is executed by the paragraph recognition processing module 1030 in Step S1412 of the flowchart exemplified in FIG. 14, will be described with reference to a flowchart shown in an example of FIG. 16.

Figure 17A:
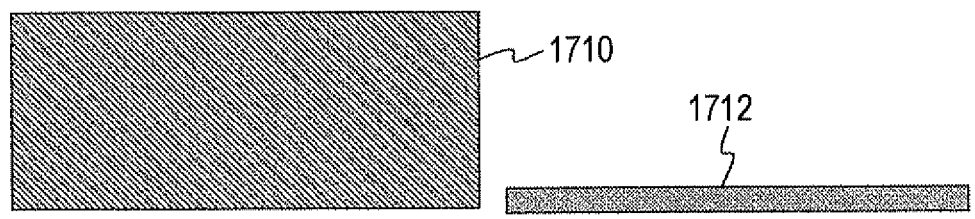
FIG. 17 is an explanatory diagram showing an exemplary case that paragraph registration is disabled because of rightward/leftward offset.
Figure 17B:
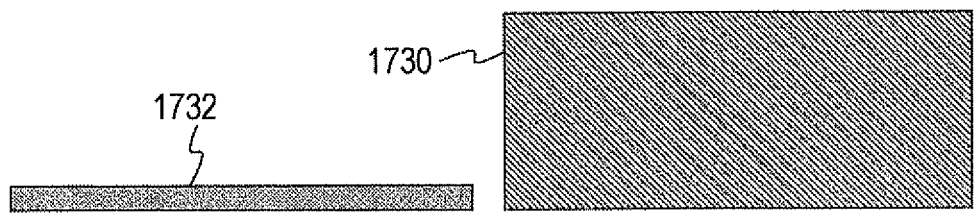
Figure 18A:
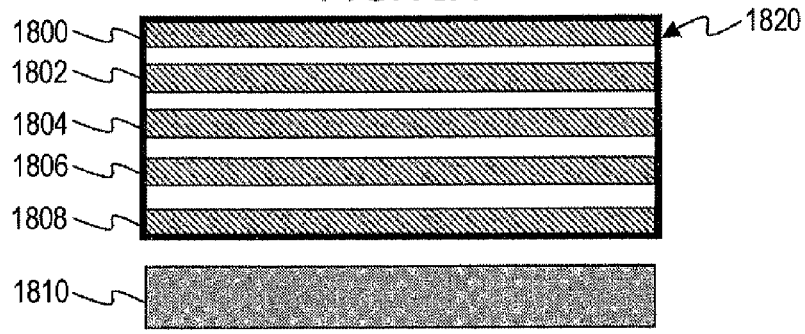
FIG. 18 is an explanatory diagram showing an exemplary case that paragraph registration is disabled because of character size.
Figure 18B:
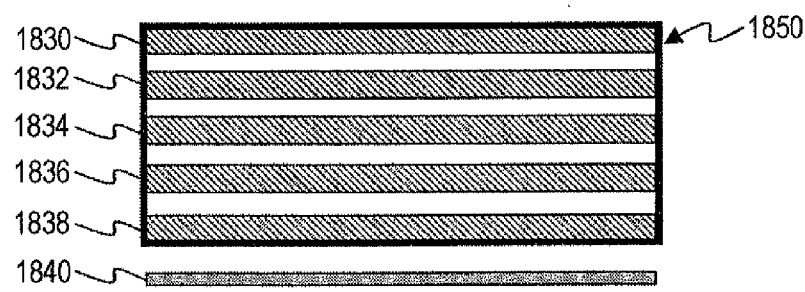

In Step S1602, it is determined whether or not current search row is shifted to the rightward or the leftward from a paragraph bounding rectangle of a current paragraph. In other words, it is determined whether or not the left end of the current search row is positioned on the right of the right end of the current paragraph or whether or not the right end of the current search row is positioned on the left of the left end of the current paragraph. For example, as shown in an example of FIG. 17A, it is determined whether or not a current search row 1712 is shifted to the rightward of a current paragraph 1710. Alternatively, as shown in an example of FIG. 17B, it is determined whether or not a current search row 1732 is shifted to the leftward of a current paragraph 1730. When the current search row is shifted to the rightward or the leftward as shown in the examples of FIG. 17, the current search row is not registered in the current paragraph and the processing returns to Step S1404 shown in the example of FIG. 14. Otherwise, the processing proceeds to Step S1604.

In Step S1604, it is determined whether or not the current search row should be registered based on the character size (including row height) of the current search row and that of the row registered in the current paragraph. In other words, it is determined whether or not the character size of the current search row is larger/smaller than that of the registered row within the current paragraph. For example, determination of the character size in Step S1604 is executed using the row height as shown in an example of FIG. 18. In other words, a comparison is executed between average row height of rows already registered in a current paragraph 1820 (i.e., rows 1800 to 1808) and a current search row 1810, whereas a comparison is executed between average row height of rows already registered in a current paragraph 1850 (i.e., rows 1830 to 1838) and a current search row 1840. When the row height of the current search row 1810 is greater than the average row height by a preliminarily set amount as shown in an example of FIG. 18A, or when the row height of the current search row 1840 is less than the average row height by a preliminarily set amount as shown in an example of FIG. 18B, the processing returns to Step S1404 shown in the example of FIG. 14 without registering the current search row 1810/1840 in the current paragraph 1820/1850. Otherwise, the processing proceeds to Step S1606.

In Step S1606, it is determined whether or not the current search row is shifted to the below with respect to the paragraph bounding rectangle of the current paragraph. In other words, a comparison is executed between max_y of the paragraph bounding rectangle 1510 of the current paragraph shown in an example of FIG. 15 (post-update max_y in FIG. 15) and min_y of the row bounding rectangle 1350 of the current search row shown in an example of FIG. 13. If a relation "max_y≤min_y" is satisfied, the processing proceeds to Step S1608. On the other hand, if a relation "max_y>min_y" is satisfied, the processing proceeds to Step S1414 shown in the example of FIG. 14. Then, the current search row is registered in the current paragraph and the paragraph information is updated.

Similarly to Step 1604, in Step S1608, a comparison is executed between average row height of rows stored in the current paragraph and row height of the current search row. When the row height of the current search row is greater or less than the average row height by a preliminarily set amount, the processing returns to Step S1404 shown in the example of FIG. 14 without registering the current search row in the current paragraph. Otherwise, the processing proceeds to Step S1610.

In Step S1610, a comparison is executed between a space between the current search row and the current paragraph and spaces between rows already registered in the current paragraph. More specifically, a comparison is executed between average value of spaces between adjacent rows already registered in the current paragraph and distance between the current search row and the paragraph bounding rectangle of the current paragraph (min_y–max_y). If the difference in the comparison is greater than a preliminarily set amount, it is determined that the spaces between adjacent rows are expanded. The processing accordingly returns to Step S1404 shown in the example of FIG. 14 without registering the current search row in the current paragraph. On the other hand, if the difference in the comparison is less than a preliminarily set amount, it is determined that the spaces adjacent rows are constantly fixed and the processing proceeds to Step S1612.

Figure 19:
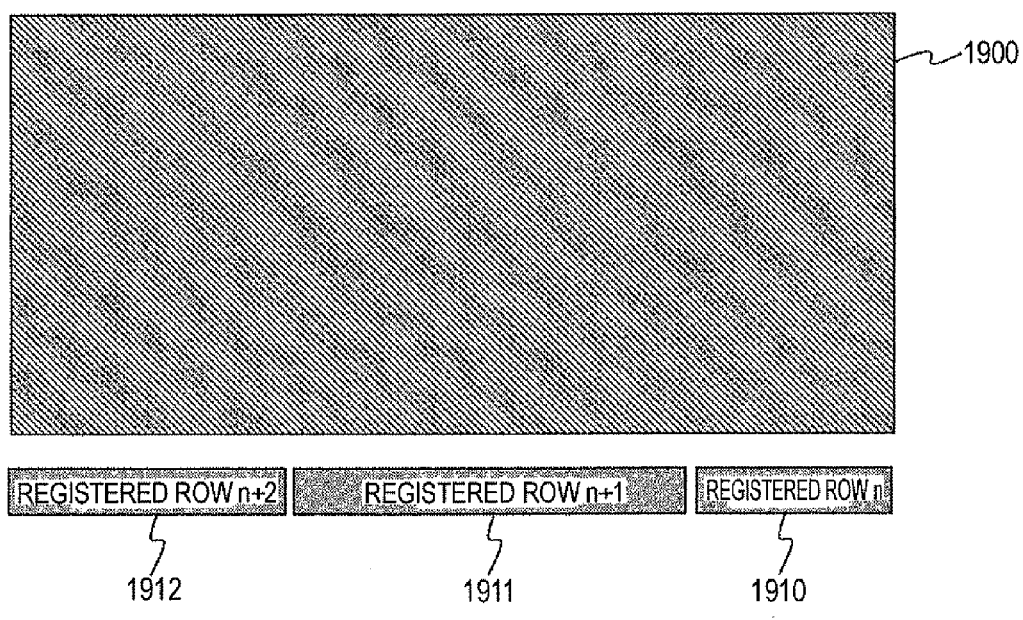
FIG. 19 is an explanatory diagram showing an exemplary condition that plural lines are included in an identical row.

In Step S1612, it is determined whether or not plural registered rows are included in the identical row disposed immediately before the current search row. If plural registered rows are included in the identical row, they are sorted in the ascending order using x-coordinate values min_x of row bounding rectangles surrounding them. The identical row herein refers to a row (or rows in some cases) that a y-coordinate value of a row bounding rectangle thereof and that of the current search row falls in a preliminarily set range. Additionally, the identical row is recognized to be different from the current search row by the line recognition processing module 1010, and has been registered previously from the current search row in the process of producing the current paragraph by the paragraph recognition processing module 1030. Note the expression that y-coordinate falls in a preliminarily set range indicates that y-coordinate exists in a y-coordinate range that single row exists in the paragraph. If plural registered rows are not included in the identical row, the processing proceeds to Step S1414 shown in the example of FIG. 14 without any changes. Then, the current search row is registered in the current paragraph and the paragraph information is updated. FIG. 19 shows an example that three registered rows (registered rows 1910, 1911, and 1912) are arranged in the identical row. In the example of FIG. 19, the three registered rows are sorted in the ascending order using "min_x": the registered row 1910, "min_x": the registered row 1911 and "min_x": the registered row 1912, which are x-coordinate values of the row bounding rectangles of the registered rows. After the sort processing is completed, the processing proceeds to Step S1414 shown in the example of FIG. 14. Then, the current search row is registered in the current paragraph and the paragraph information is updated.

The paragraph integration processing module 1040 is connected to the paragraph recognition processing module 1030 and the character information correction processing module 1050. The paragraph integration processing module 1040 integrates paragraphs extracted by the paragraph recognition processing module 1030, and calculates the information of the paragraphs. Then, the paragraph integration processing module 1040 transfers the calculated paragraph information to the character information correction processing module 1050.

More specifically explained, the paragraph integration processing module 1040 integrates the paragraphs recognized by the paragraph recognition processing module 1030 using the paragraph representative values (max_h) of the respective paragraphs.

Figure 20:
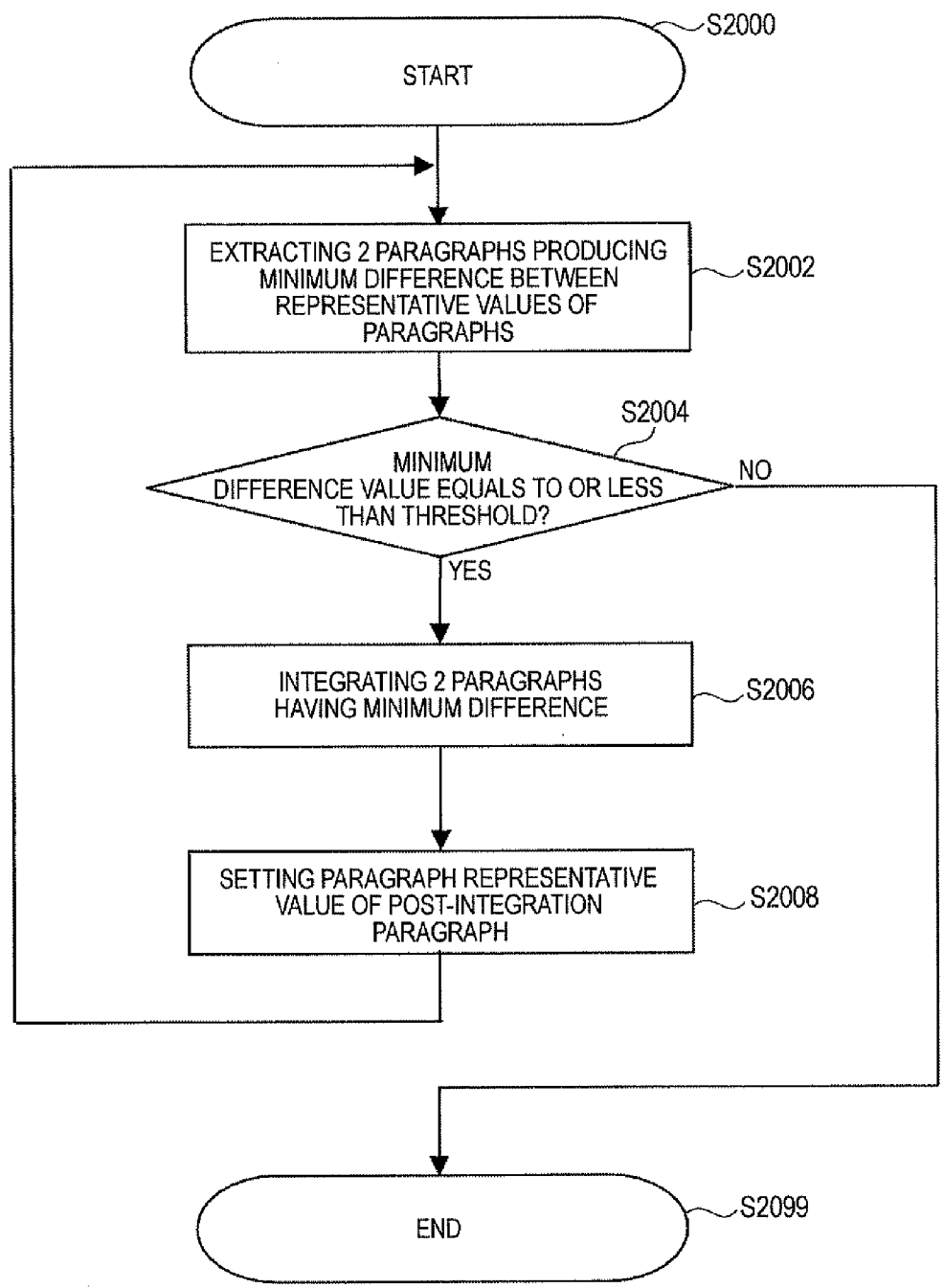
FIG. 20 is a flowchart showing an exemplary paragraph integration processing by a paragraph integration processing module.

FIG. 20 is a flowchart showing an exemplary processing of integrating paragraphs executed by the paragraph integration processing module 1040.

In Step S2002, differences in representative values max_h are calculated for all the pairs of paragraphs recognized by the paragraph recognition processing module 1030, and a pair of paragraphs is extracted that have the minimum difference in representative values (hereinafter referred to as "minimum difference value").

In Step S2004, a comparison is executed between the minimum difference value calculated in Step S2002 and a preliminarily set threshold. If the minimum difference value is greater than a preliminarily set threshold (No in Step S2004), it is determined that there is no more paragraph to be integrated left. Accordingly, the paragraph integration processing is finished in the paragraph integration processing module 1040 (Step S2099). On the other hand, if the minimum difference value is less than a predetermined threshold (Yes in Step S2004), the processing proceeds to Step S2006.

In Step S2006, two paragraphs are integrated that are extracted in Step 2002 as a pair of paragraphs having the minimum difference value. For example, paragraph integration herein means that the same identification number or the like is assigned or added to the paragraph information of the two paragraphs for indicating that the paragraphs have closer paragraph representative values.

In Step S2008, the paragraph representative value max_h of the paragraph created by integrating two paragraphs in Step S2006 is set to be the larger one of the paragraph representative values of the two paragraphs to be integrated, and the processing returns to Step S2002. In short, the paragraph representative value max_h of the post-integration paragraph is set to be the larger one of the paragraph representative values max_h of the pre-integration paragraphs.

As described above, the paragraph integration processing module 1040 thus repeatedly executes the integration processing Steps S2002 to S2008 for integrating paragraphs until the condition is satisfied in Step S2004 that the minimum difference value calculated in Step S2002 is greater than a preliminarily set threshold.

The character information correction processing module 1050 is connected to the paragraph integration processing module 1040. The character information correction processing module 1050 calculates positions and sizes of rectangles respectively surrounding pixel clusters within a post-integration paragraph produced by the paragraph integration processing module 1040 based on heights of rows (i.e., lines) in the post-integration paragraph and intervals between adjacent image clusters forming each line. Based on the above, the character information correction processing module 1050 corrects the character information data received by the line recognition processing module 1010. For example, heights of rows (i.e., lines) or widths of columns (i.e., lines) may be constantly set within the post-integration paragraph produced by the paragraph integration processing module 1040, and positions and sizes of rectangles respectively surrounding image clusters within the post-integration paragraph may be calculated for preventing intervals from being produced between adjacent characters. Further, if equivalently shaped characters are included in the document, positions and sizes of rectangles surrounding the characters may be equivalent to each other. Here, the equivalently shaped characters refer to those that are equivalent as character images or bounding rectangles. More specifically, when characters are equivalent as character images, features of the character images are extracted and distance between values of the extracted features falls within a preliminarily set threshold range in the feature space. On the other hand, when characters are equivalent as bounding rectangles, a difference between heights and widths of the bounding rectangles is less than or equal to a preliminarily set threshold. Further, sizes of the bounding rectangles may be calculated based on a language of characters within the document.

Figure 21:
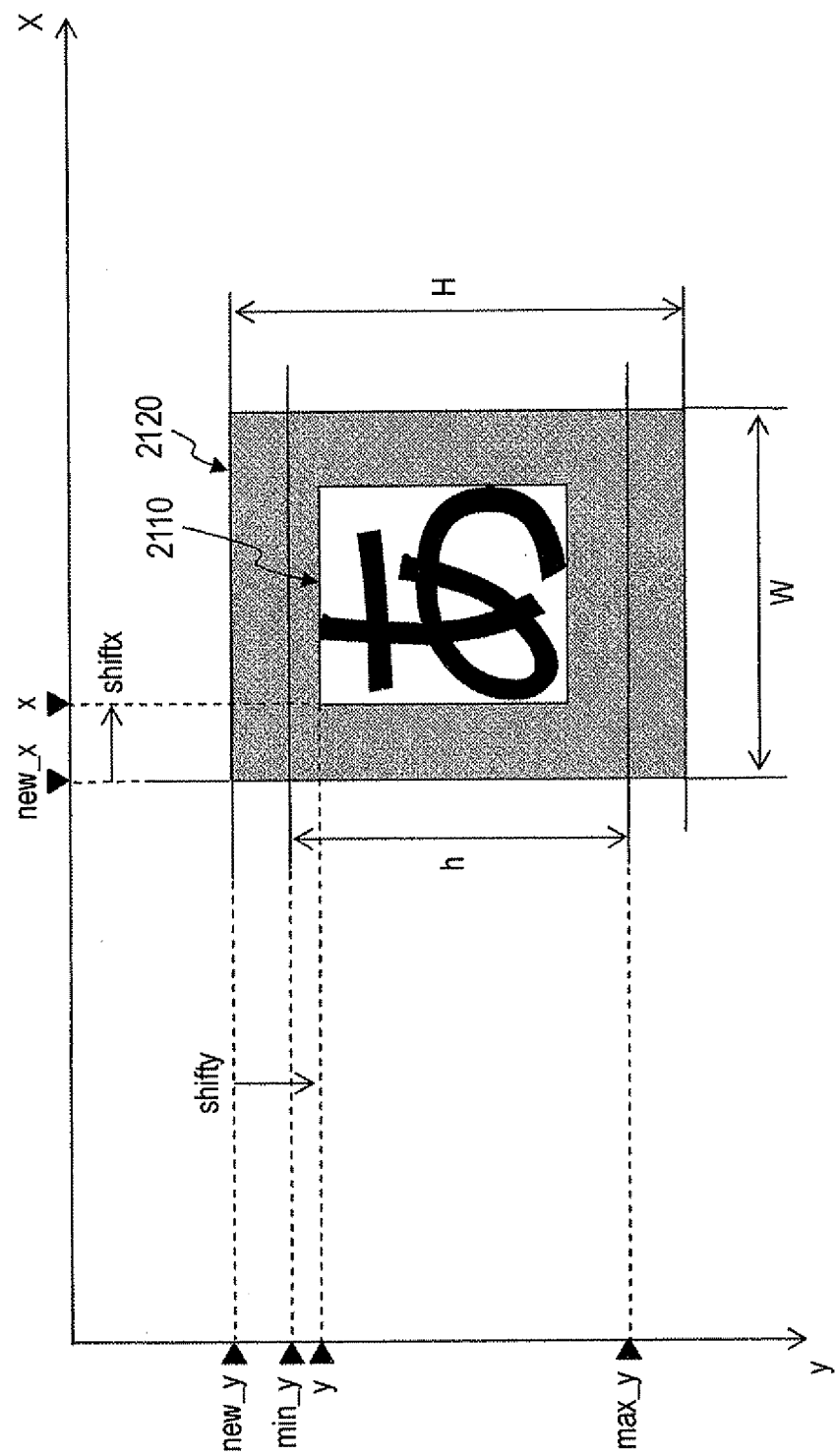
FIG. 21 is an explanatory diagram showing an exemplary character information correction processing.

The character information correction processing module 1050 calculates a rectangle correction value based on the paragraph representative value max_h of the post-integration paragraph created by the paragraph integration processing module 1040 and the maximum inter-bounding rectangle distance max_g calculated by the line feature calculation module 1020. Based on this, the character information correction processing module 1050 corrects the character information data classified on a row-to-row basis. FIG. 21 shows a specific exemplary processing to be executed by the character information correction processing module 1050 for correcting the character information.

The character information correction processing module 1050 calculates correction values shown in the example of FIG. 21 as follows.

Correction rectangle height H is set to be the paragraph representative value max_h of the post-integration paragraph that the character information data is included as a correction object.

Correction rectangle width W is calculated with the following Formula (1) using the maximum inter-bounding rectangle distance max_g of a row that the character information data is included as a correction object.

$$W = \max\_g + w \qquad \text{Formula (1)}$$

In the formula (1), w indicates pre-correction bounding rectangle width (which is included in the original character information data received by the line recognition processing module 1010).

An upper left x-coordinate value (new_x, new_y) of a corrected rectangle 2120 is calculated with the following Formula (2).

$$\text{new}\_x = x - \max\_g/2$$

$$\text{new}\_y = \min\_y - (H-h)/2 \qquad \text{Formula (2)}$$

Formula (2) has the following settings: x is an upper left x-coordinate value of a pre-correction bounding rectangle 2110; max_g is a representative value of the maximum inter-bounding rectangle distance of a row that the character information data is included as a correction object; min_y is the minimum value of y-coordinate of a row that the character information data is included as a correction object; H is height of the corrected rectangle 2120; and h is pre-correction bounding rectangle height.

Relative displacement (shiftx and shifty) from the corrected rectangle 2120 to a bounding rectangle 2110 is calculated with the following Formula (3).

$$\text{shiftx} = \max\_g/2$$

$$\text{shifty} = y - \text{new}\_y \qquad \text{Formula (3)}$$

In Formula (3), y indicates an upper left y-coordinate value of the pre-correction bounding rectangle 2110.

As described above, the character information correction processing module 1050 executes a correction processing of producing a corrected character rectangle from the bounding rectangle information of the input character information data so that heights of rectangles of characters can be aligned and no interval is produced between adjacent rectangles.

Further, when equivalently shaped characters are included in the document (when characters are equivalent as character images or bounding rectangles), the character information correction processing module 1050 may set positions and sizes of the corrected character rectangles to be equivalent to each other. Further, the data amount of the entire document may be reduced by sharing the data of the corrected character rectangles within the corrected character information data.

Further, the character information correction processing module 1050 may calculate a size of a corrected character rectangle based on the language of characters within the document in addition to the foregoing correction. For example, if the object document is described in Japanese language, the character information correction processing module 1050 may set the corrected rectangle width W to be the same as the corrected rectangle height H so that the corrected character rectangle can be formed in a square shape. Note a language of characters within the object document is determined using a header of the language included in the document, a character code, a result of the character recognition processing when an image is used, etc.

Further, when the character information data are equivalent, the post-correction data may be set to be equivalent and the data amount of the entire document may be reduced by sharing the corrected data while associating the corrected data with the character information data. In other words, the identical two character information data may be extracted from plural character information data received by the line recognition processing module 1010, and single post-correction data, which is a result of the character information data processing by the present exemplary embodiment, may be associated with the extracted equivalent two character information data.

The paragraph division processing module 630 produces paragraph numbers based on an output of the character information correction processing module 1050 (which may be an output of the paragraph recognition processing module 1030 or the paragraph integration processing module 1040) and extracts the paragraph information based on the paragraph numbers. In other words, the paragraph division processing module 630 produces paragraph numbers according to the paragraph order information included in the paragraph information, and extracts an image of a paragraph from the positional information of a bounding rectangle surrounding the paragraph that is included in the paragraph information. Further, the paragraph division processing module 630 may transfer the information regarding the paragraph order (paragraph order values) as the paragraph numbers to the paragraph title determination processing module 640 and the document format processing module 650 while transferring the information regarding paragraphs as the paragraph information to the paragraph title determination processing module 640.

Note processing executed by the paragraph division processing module 630 is not limited to the above, and any suitable methods are applied to the processing as long as a page is thereby divided into plural parts.

For example, a character code of a full-stop punctuation may be used as a separator of paragraphs. As a specific example, the paragraph division processing module 630 includes a character recognition module, and sequentially receives character codes as a result of character recognition by the character recognition module. In this case, the paragraph division processing module 630 determines that paragraphs are separated when it receives the character code of the full-stop punctuation (or a period code, etc.).

Alternatively, the paragraph division processing module 630 may sequentially receive character codes and character positions as a result of character recognition by the character recognition module. For example, X and Y coordinates of an upper left position of a bounding rectangle of a character are set as a position of the character. The XY coordinate system herein has a configuration that the upper left end of an image is set to be the origin (X=0, Y=0) while X increases to the rightward and Y increases to the downward. Note excluding the upper left position of a bounding rectangle, any suitable position can be set as a position of the bounding rectangle. Subsequently, calculations are executed for a difference in X-coordinate values of sequentially received character positions and a difference in Y-coordinate values of sequentially received character positions. When the difference in the X-coordinate values and that in the Y-coordinate values are both greater than a preliminarily set threshold, it may be determined that paragraphs are separated.

Alternatively, a paragraph separator(s) may be fixed within a page. For example, if a page is divided into four areas by horizontally dividing the page into two areas at the horizontal middle of it and vertically dividing the page into two areas in the vertical middle of it, the obtained four areas may be set as four paragraphs.

Alternatively, an image may be divided into areas and the obtained areas may be set as paragraphs using a method described in Laid-open Japan Patent Publication No. 2000-090194 or a method described in the publication as a related art. As a specific example, it is determined whether a text included in a document is vertically described or horizontally described. Then, a boundary is set for dividing the document with reference to the determined result, and divides the document in the set boundary. Further, a logic product is calculated for the image obtained by expanding the document in the horizontally-described text direction and the image obtained by expanding the document in the vertically-described text direction. Then, the logic product image is received as a new document. In the boundary setting, calculations are executed for projection distributions of pixels forming the document in the horizontally-described text direction and the vertically-described text direction. Then, the boundary setting is set based on the calculated projection distributions. If the text included in the document is mainly vertically described as a result of the foregoing determination, probability of setting the boundary in the vertically-described text direction is increased. On the other hand, if the text included in the document is mainly horizontally described as a result of the foregoing determination, probability of setting the boundary in the horizontally-described text direction is increased. Whether the text included in the document is mainly vertically described or horizontally described is calculated from the arrangement information of character images in the coupled components of the document.

Alternatively, any other suitable methods may be used.

The paragraph title determination processing module 640 is connected to the paragraph division processing module 630 and the document format processing module 650. The paragraph title determination processing module 640 determines titles of paragraphs divided by the paragraph division processing module 630 based on the components included in the divided paragraphs. As a specific example, the paragraph title determination processing module 640 receives a paragraph image and determines a title of the image (paragraph title). A paragraph title may be determined by extracting first "P" character(s) of a paragraph as the paragraph title. Here, "P" is a preliminarily set number of characters in the paragraph title. Alternatively, the page title determining method by the page title determination processing module 120 according to the foregoing first or second exemplary embodiment may be used as the paragraph title determining method.

The document format processing module 650 is connected to the page processing module 610, the page title determination processing module 620, the paragraph division processing module 630, and the paragraph title determination processing module 640. The document format processing module 650 executes processing equivalent to that of the document format processing module 130 exemplified in FIG. 1, and further executes processing of paragraphs. In other words, the document format processing module 650 further sets the headings determined by the paragraph title determination processing module 640 as the second level outline information of the pages divided by the page processing module 610. The hierarchical levels within the outline information (specifically, information of in which pages the paragraphs are included) are determined by correspondence with the page numbers received from the page processing module 610.

More specifically, the document format processing module 650 executes a processing equivalent to that of the document format processing module 130. For example, the document format processing module 650 receives the page numbers and the page titles from the page processing module 110 and the page title determination processing module 120, respectively. Using them, the document format processing module 650 applies the meta information that the page titles are set as the first level outline to the document format.

Further, the document format processing module 650 receives paragraph numbers from the paragraph division processing module 630, receives paragraph titles corresponding to the paragraph numbers from the paragraph title determination processing module 640, and applies the meta information of setting the titles as the second level outline corresponding to the pages to the document format. Simultaneously, the document format processing module 650 receives the page information (i.e., single-page image) from the page processing module 110, and executes a processing of converting the received image into the output document format.

Figure 8:
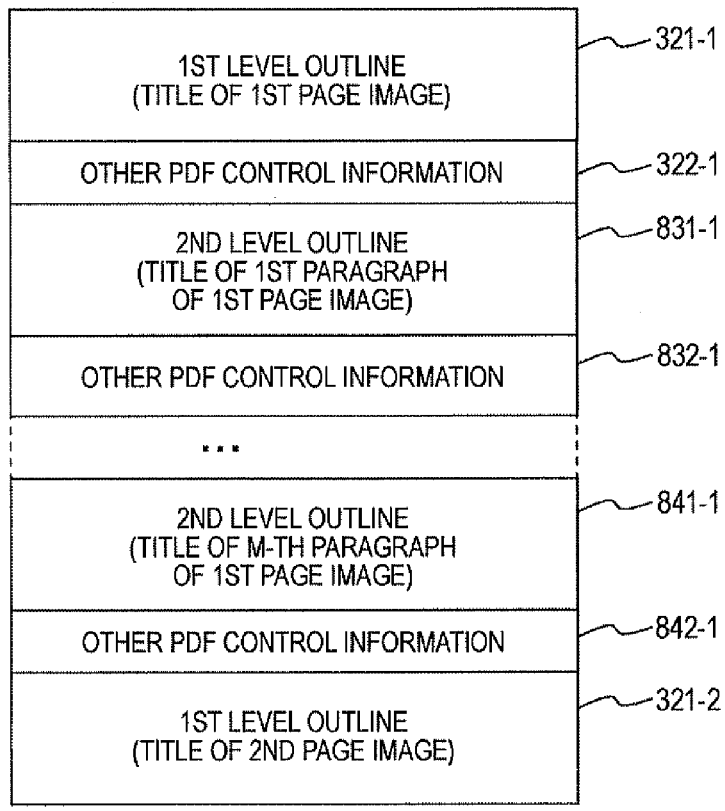
FIG. 8 is an explanatory diagram showing an exemplary format of an output document according to the third exemplary embodiment.

FIG. 8 shows an exemplary case that PDF is set as the output document format. The output document format exemplified in FIG. 8 is formed by adding the second level outline information of Page 1 between the other PDF control information 322-1 and the first level outline (a title of an image of Page 2) 321-2 in the output document format exemplified in FIG. 3B. More specifically, after a pair of the first level outline (a title of an image of Page 1) 321-1 storing the title of Page 1 and the other PDF control information 322-1 of the first level outline is provided, a pair of the second level outline (a title of Paragraph 1 of the image of Page 1) 831-1 storing the title of the first paragraph of Page 1 and the other PDF control information 832-1 of the second level outline of the paragraph is provided. Subsequently, the pairs of the second level outline and the other PDF control information regarding the second paragraph and succeeding paragraphs (i.e., a pair of a second level outline (title of Paragraph M of the image of Page 1) 841-1 and other PDF control information 842-1, etc.) are sequentially given. Similarly, the first level outline information and the second level outline information, which are equivalent to those of Page 1, are given regarding the second page and succeeding pages.

Figure 7:
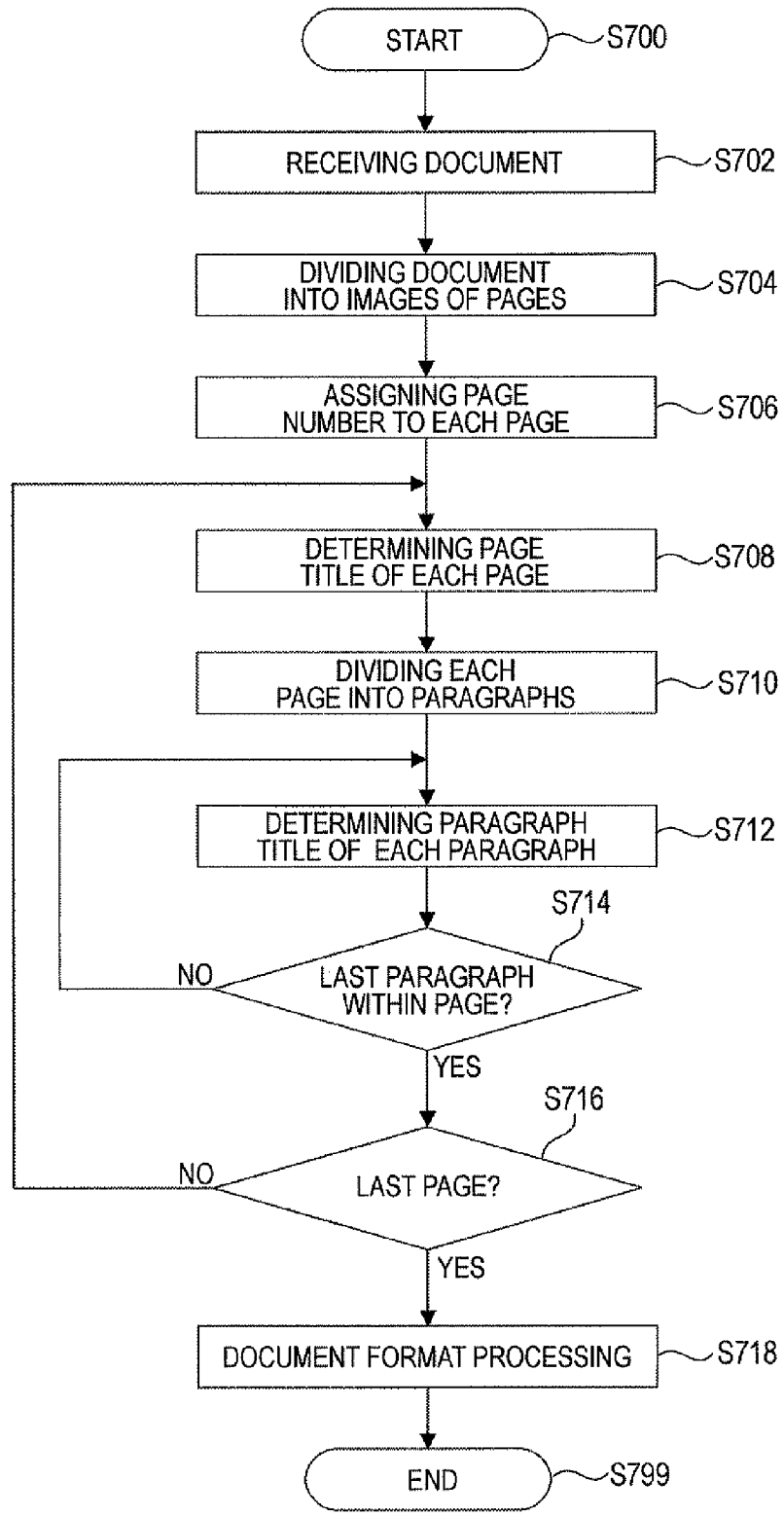
FIG. 7 is a flowchart showing an exemplary processing according to the third exemplary embodiment.

FIG. 7 is a flowchart showing an exemplary processing according to the third exemplary embodiment.

In Step S702, the page processing module 610 receives a document.

In Step S704, the page processing module 610 divides the document into images of pages.

In Step S706, the page processing module 610 assigns page numbers to the respective pages.

In Step S708, the page title determination processing module 620 determines titles of the respective pages.

In Step S710, the paragraph division processing module 630 divides each page into paragraphs.

In Step S712, the paragraph title determination processing module 640 determines paragraph titles of the respective paragraphs.

In Step S714, the paragraph title determination processing module 640 determines whether or not a paragraph title is determined for the last paragraph of the page. If a paragraph title is determined for the last paragraph, the processing proceeds to Step S716. Otherwise, the processing returns to Step S712.

In Step S716, the page title determination processing module 620 determines whether or not a page title is determined for the last page. If a page title is determined for the last page, the processing proceeds to Step S718. Otherwise, the processing returns to Step S708.

In Step S718, page titles and paragraph titles have been determined for the first to last pages. Therefore, the document format processing module 650 executes a document format processing and outputs the formatted document.

Figure 9:
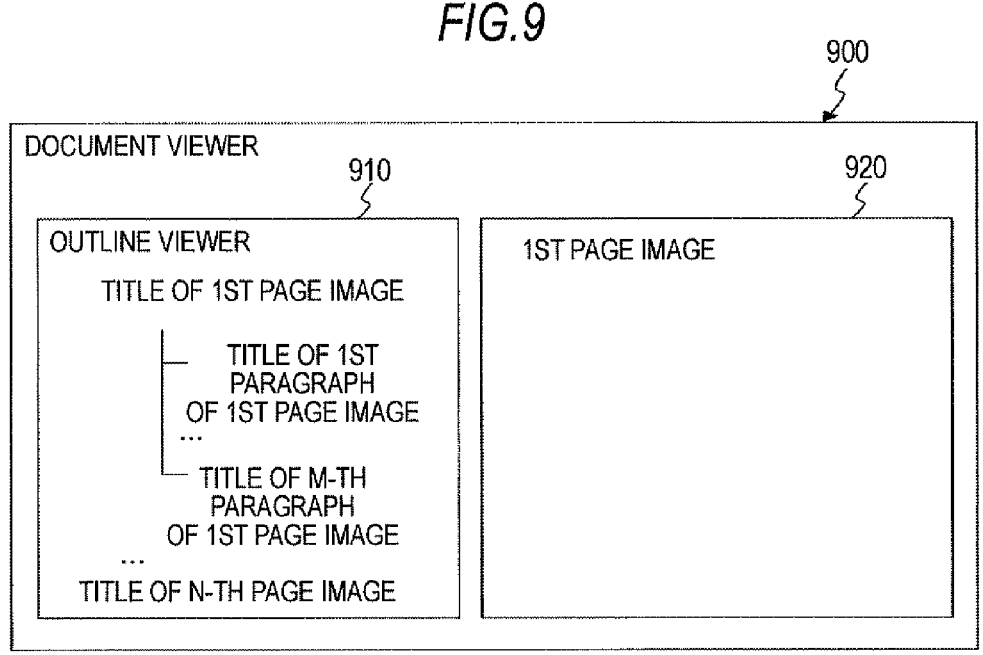
FIG. 9 is an explanatory diagram showing a display example of the output document according to the third exemplary embodiment.

Thus produced document is displayed with a document viewer suitable for the format as exemplified in FIG. 9.

The document viewer displays an outline viewer display area 910 and a page image display area 920 within a document viewer display area 900. In the document viewer, an image of each is displayed in the page image display area 920. Further, the document viewer is optionally provided with an outline viewer. When the outline viewer is opened, titles of the respective pages and titles of paragraphs included in the respective pages are hierarchically displayed in the outline viewer display area 910. When any one of the titles of the respective pages displayed in the outline viewer display area 910 is selected through an operation of a user, an image of a page currently displayed in the page image display area 920 is changed into an image of the selected page. On the other hand, when any one of the titles of the respective paragraphs displayed in the outline viewer display area 910 is selected through an operation of a user, an image of a paragraph currently displayed in the page image display area 920 is changed into an image of the selected paragraph. In other words, the processing can be executed by setting the page titles as the first level outline and setting the paragraph titles as the second level outline.

<Fourth Exemplary Embodiment>

In the foregoing exemplary embodiments, the first level outline information and the second level outline information for each page are extracted. In other words, respective pages are independent from each other in terms of the hierarchical structure (first level, second level). In the fourth exemplary embodiment, the hierarchical structure of titles independently set for the respective pages is changed using an inter-page relation.

In the fourth exemplary embodiment, a function is further given to the document format processing module 650 according to the foregoing third exemplary embodiment. Configurations, functions, etc. of the other modules in the fourth exemplary embodiment are equivalent to those in the third exemplary embodiment. When modules in the fourth exemplary embodiment are the same as those in the third exemplary embodiment, the identical reference numerals are given to them, and repetitive explanation thereof will be avoided.

In the fourth exemplary embodiment, a document of plural pages is considered as a processing object. Accordingly, the page processing module 610 receives a document of plural pages.

Figure 23:
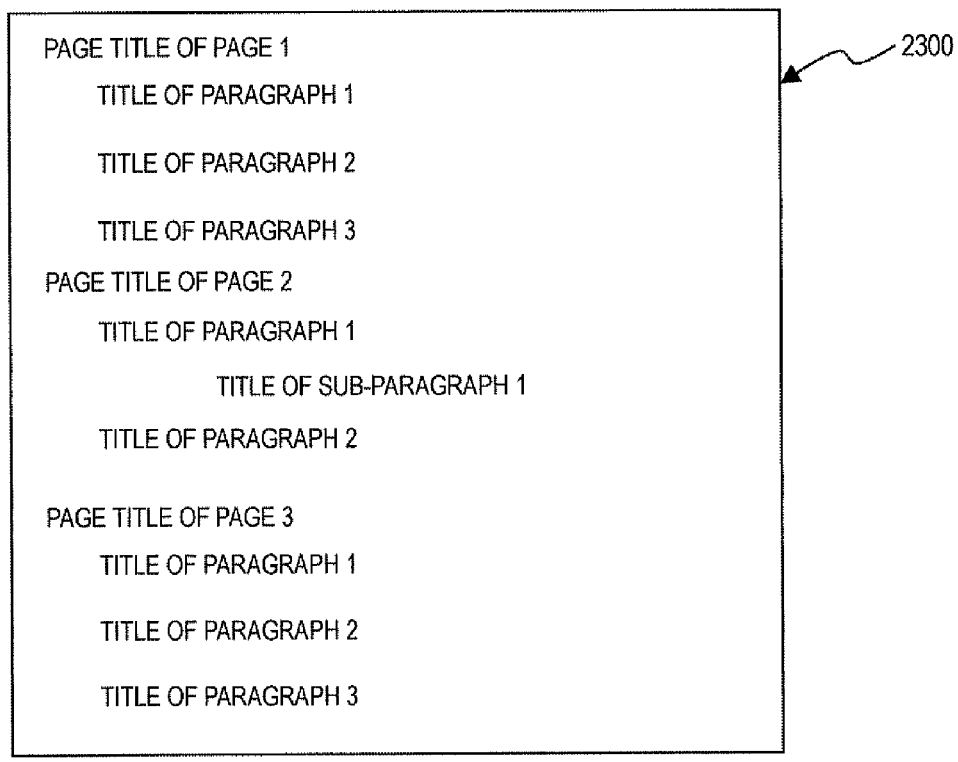
FIG. 23 is an explanatory diagram showing an exemplary output document according to the third exemplary embodiment.

When a document of plural pages is a processing object, an output document in the third exemplary embodiment is an output document 2300 exemplified in FIG. 23.

In short, page titles are assigned to the respective pages. Each page may include plural paragraphs. For example, in the output document 2300, Page 1 includes three paragraphs. Further, each paragraph may include plural sub-paragraphs. For example, in the output document 2300, Page 2 includes Sub-paragraph 1 in Paragraph 1. Note paragraphs are included in a hierarchal level immediately lower than that of pages, whereas sub-paragraphs are included in a hierarchical level immediately lower than that of paragraphs.

The output document 2300 exemplified in FIG. 23 has titles obtained using the third exemplary embodiment. Therefore, each page has an independent hierarchical structure. In this case, the hierarchical level of page titles is set to be the highest hierarchical level. Further, the hierarchical level of paragraphs within a page is a hierarchical level immediately lower than that of page titles. The hierarchical level of sub-paragraphs is a hierarchical level immediately lower than that of paragraphs.

In an actual document, however, a page title of Page 1 and that of Page 2 may not be necessarily included in the same hierarchical level. For example, the page title of Page 1 may be a title of the entire document, whereas the page title of Page 2 may be a title of a chapter. In this case, the page title of Page 2 should be extracted as a hierarchical level lower than that of the page title of Page 1.

In response to this, in the fourth exemplary embodiment, inter-page relation of the hierarchical structure is extracted and hierarchical levels are changed into those shared across pages.

Figure 22:
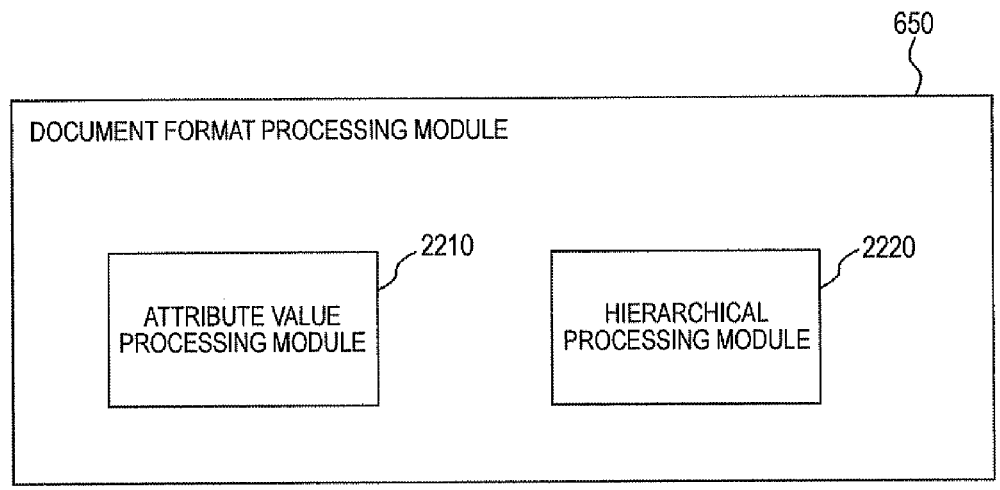
FIG. 22 is a schematic module configuration diagram of an exemplary configuration of a document format processing module according to a fourth exemplary embodiment.

FIG. 22 is a schematic module configuration diagram of an exemplary configuration of the document format processing module 650 according to the fourth exemplary embodiment. The document format processing module 650 includes an attribute value processing module 2210 and a hierarchical processing module 2220.

The attribute value processing module 2210 extracts an attribute of a page heading determined by the page title determination processing module 620 or an attribute of a paragraph heading determined by the paragraph title determination processing module 640.

The hierarchical processing module 2220 determines an inter-page hierarchical structure based on the attribute of the heading of the page/paragraph extracted by the attribute value processing module 2210.

The attribute value processing module 2210 and the hierarchical processing module 2220 executes processing after the processing by the document format processing module 650 in the third exemplary embodiment is completed.

Figure 24:
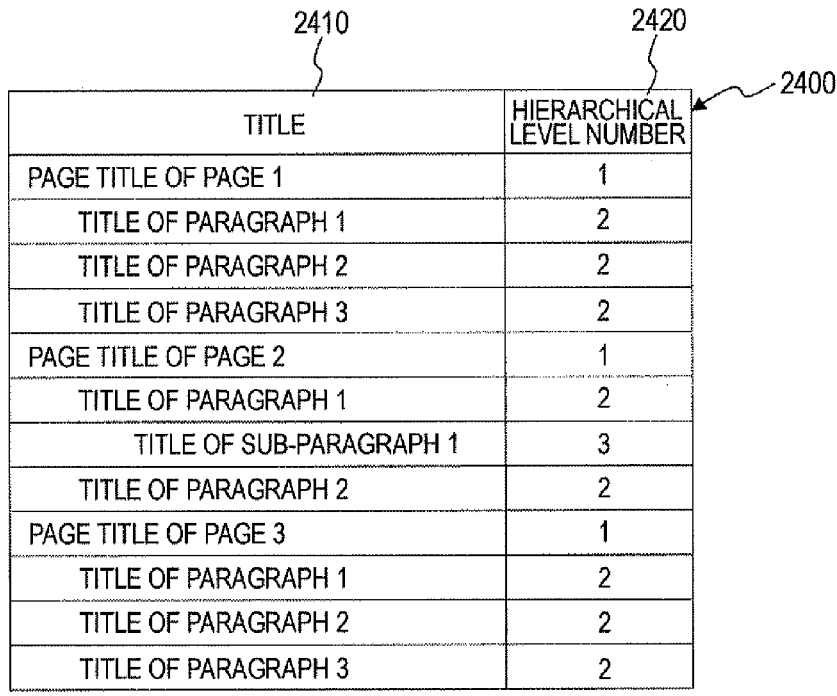
FIG. 24 is an explanatory diagram showing an exemplary data structure of a title-hierarchy table.

Now, the hierarchical level number is defined. The hierarchical level number is a number for indicating a level (i.e., higher level or lower level) of in the hierarchy. Hierarchical number 1 is set to be the highest level. Hierarchical number 2 is set to be the next level immediately below Hierarchical number 1. Hierarchical level number 3 is set to be the next level immediately below Hierarchical level 2. Using the hierarchical level numbers, the hierarchical structure of the output document 2300 exemplified in FIG. 23 can be described as a title-hierarchical level table 2400 exemplified in FIG. 24. The title-hierarchical level table 2400 includes title fields 2410 and hierarchical level number fields 2420. The title fields 2410 store titles in the respective hierarchical levels, whereas the hierarchical level number fields 2420 store the hierarchical level numbers thereof. For example, Hierarchical level number 1 is assigned to page titles of the respective pages. Hierarchical level number 2 is assigned to paragraph titles. Hierarchical level number 3 is assigned to sub-paragraph titles. The title-hierarchical level table 2400 is stored within the document format processing module 650, and each value is stored by the document format processing module 650. In this phase, the following correspondences are set: the page titles to Hierarchical level number 1; the paragraph titles to Hierarchical level number 2; and the sub-paragraph titles to Hierarchical level number 3.

The attribute value processing module 2210 obtains attribute values of titles. The attribute values indicate evaluation values. Specifically, a larger attribute value is assigned to a higher hierarchical level, whereas a smaller attribute value is assigned to a lower hierarchical level.

For example, the attribute value includes values of: size of a character in each title; thickness of a line forming a character; color of a character; a position of the first character; and distance between adjacent rows (columns may be hereinafter used instead). Alternatively, weighted linear sum of plural attribute values (e.g., character thickness, character size, distance between adjacent rows, etc).

When a title is horizontally described, height of a bounding rectangle of a character string of the title, etc. may be obtained as size of a character. On the other hand, when a title is vertically described, width of a bounding rectangle of a character string of the title, etc. may be obtained as size of a character.

Density of a bounding rectangle of a character string of a title, etc. may be obtained as thickness of a character. Further, thickness may be measured for some of lines forming a character, which have length greater than or equal to a preliminarily set value.

A pixel value of a character of a title may be obtained as color of a character.

When a title is horizontally described, distance from the left end character in the title to the left edge of a page may be obtained as a position of the first character. On the other hand, when a title is vertically describe, distance from the upper end character in the title to the top edge of a page may be obtained as a position of the first character.

When a title is horizontally described, distance between adjacent rows may be obtained by calculating vertical distance between adjacent rows. On the other hand, when a title is vertically described, distance between adjacent columns may be obtained by calculating horizontal distance between adjacent columns.

As character size of a title gets larger, chances get higher that the title is classified into a higher hierarchical level. Further, as character thickness of a title gets thicker, chances get higher that the title is classified into a higher hierarchical level. Further, regarding character color, a table may be prepared for indicating correspondence between character colors and attribute values. Using the correspondence table, a title may be configured to be classified into a higher hierarchical level as an attribute value corresponding to character color of the title gets larger. Further, as inverse of a position of the first character of a title gets larger, chances get higher that the title is classified into a higher hierarchical level. Further, as distance between adjacent rows (columns may be hereinafter used instead) of a title gets larger, chances get higher that the title is classified into a higher hierarchical level.

In the present exemplary embodiment, the hierarchical structure within a page is configured that a title classified into a higher hierarchical level has an attribute value greater than that of a title classified into a lower hierarchical level.

Figure 25:
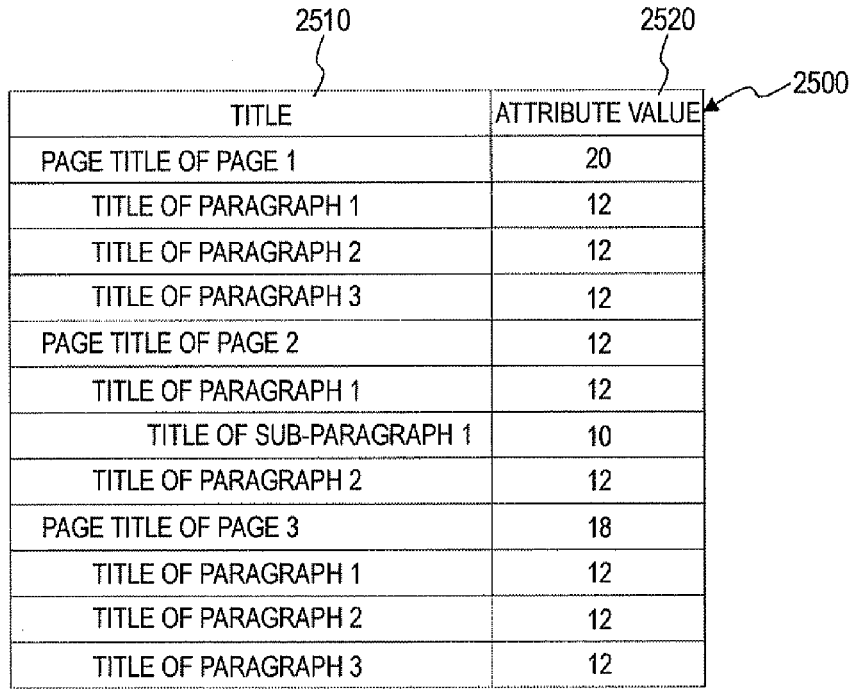
FIG. 25 is an explanatory diagram showing an exemplary data structure of a title-attribute value table.

A title-attribute value table 2500 exemplified in FIG. 25 is a table obtained by linking thus obtained attribute values to the respective titles. The title-attribute value table 2500 includes title fields 2510 and attribute value fields 2520. The title fields 2510 store titles in the respective hierarchical levels, whereas the attribute value fields 2520 store the attribute values of the hierarchical levels. For example, the attribute value fields 2520 store character sizes as the attribute values using points (i.e., scores). An attribute value of the page title of Page 1 is set to be 20, whereas attribute values of paragraph titles of Page 1 are set to be 12. An attribute value of the page title of Page 2 is set to be 12, whereas attribute values of paragraph titles of Page 2 are set to be 12. Further, an attribute value of a sub-paragraph title of Page 2 is set to be 10. The title-attribute value table 2500 is stored in the document format processing module 650, and each value of the table is stored by the attribute value processing module 2210.

Figure 26:
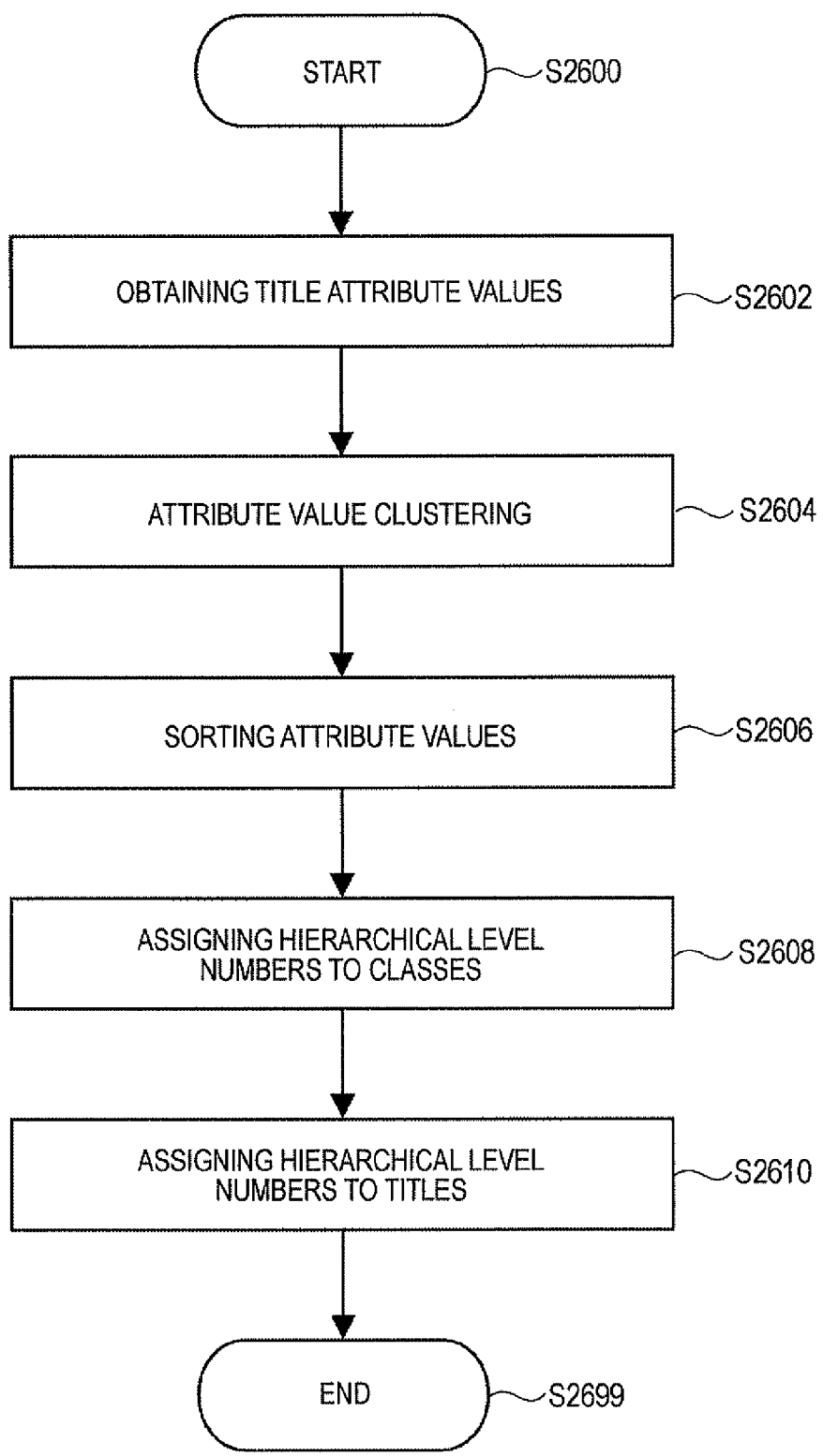
FIG. 26 is a flowchart showing an exemplary processing by a hierarchy processing module according to the fourth exemplary embodiment.

After the attribute value processing module 2210 produces the title-attribute value table 2500, the hierarchical processing module 2220 changes the hierarchical level numbers. The processing will be hereinafter explained with reference to a flowchart exemplified in FIG. 26.

In Step S2602, attribute values of the respective titles are obtained from the title-attribute value table 2500.

In Step 2604, clustering is executed for the attribute values. A normal clustering algorithm may be used for the clustering. As a specific example, K-means, cluster analysis or the like may be used. More simply, the identical values are classified into a class. For example, in the case of the title-attribute value table 2500 exemplified in FIG. 25, the attribute values can be classified four classes of 10, 12, 18 and 20. Alternatively, when an attribute value fall within a preliminarily set range from a reference attribute value (i.e., when a minute difference is ignored), the attribute values can be classified into two classes of 10 and 20.

Thus, clustering is executed for the attribute values, and the attribute values are accordingly classified. In this case, the attribute values are classified into four classes of 10, 12, 18 and 20.

In Step 2606, classes of the attribute values are sorted. Representative values of the classes are used for sorting. In the foregoing example, the classes can be sorted in the descending order of 20, 18, 12 and 10.

In Step S2608, the hierarchical level numbers are assigned to the classes. Specifically, a smaller hierarchical level number is assigned to a class having a larger attribute value. In the foregoing example, "1" is assigned to a hierarchical level number corresponding to Class 20, and "2" is assigned to a hierarchical level number corresponding to Class 18. Further, "3" is assigned to a hierarchical level number corresponding to Class 12, and "4" is assigned to a hierarchical level number corresponding to Class 10.

In Step S2610, hierarchical level numbers are finally assigned to titles. In the foregoing example, hierarchical level numbers in a title-hierarchical level table 2700 exemplified in FIG. 27 can be obtained as a result. The title-hierarchical level table 2700 is obtained by rewriting the title-hierarchical level table 2400. Specifically, hierarchical level numbers 1, 2 and 3 are included in the title-hierarchical level table 2400, but hierarchical level number 4 is added to hierarchical level numbers 1, 2 and 3 in the title-hierarchical level table 2700 through the processing of the hierarchical processing module 2220. Further, "1" is only assigned to a hierarchical level number of the page title of Page 1, and "2" is assigned to a hierarchical level number of the page title of Page 3. Although "3" is assigned to a hierarchical level number of paragraph titles of Page 1, "3" is also assigned to a hierarchical level number of the page title of Page 2.

Next, the document format processing module 650 produces and outputs a document including the processing result.

Figures 27, 28:
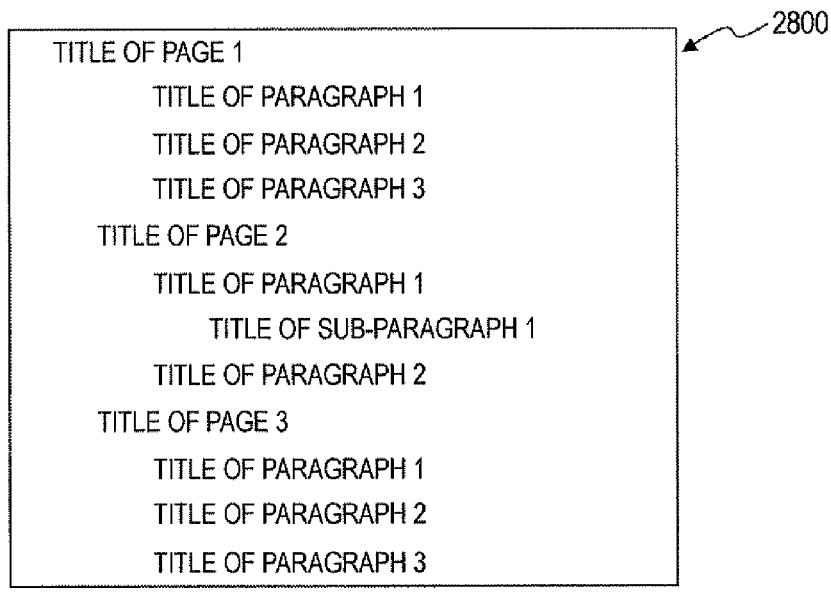
FIG. 27 is an explanatory diagram showing an exemplary data structure of a title-hierarchy table.
FIG. 28 is an explanatory diagram showing an exemplary outline viewer display area according to the fourth exemplary embodiment.

As exemplified in FIG. 28, the document thus produced is displayed using a document viewer suitable for the format of the document. The example of FIG. 28 corresponds to the outline viewer display area 910 exemplified in FIG. 9. In the outline viewer display area 2800, the hierarchical structure is displayed in a configuration that hierarchical levels get lower towards right. In other words, page titles, paragraph titles, and sub-paragraph titles within the document are hierarchically displayed in the outline viewer display area 2800. Specifically, the page title of Page 1 is arranged in the highest hierarchical level, and that of Page 3 is arranged in the hierarchical level immediately below that of Page 1. The page title of Page 2 is arranged in the third hierarchical level which is the same as that of paragraphs. Sub-paragraph titles are arranged in the hierarchical level immediately below that of the paragraph title of Paragraph 1 of Page 2.

<Fifth Exemplary Embodiment>

In the fourth exemplary embodiment, the hierarchical structure is determined for plural pages (all the pages of a document in the exemplified case). In a fifth exemplary embodiment, this is executed as a sequential processing on a page-to-page basis. The module configuration in the fifth exemplary embodiment is equivalent to that in the fourth exemplary embodiment. However, the document format processing module 650 executes the following processing.

Figure 29:
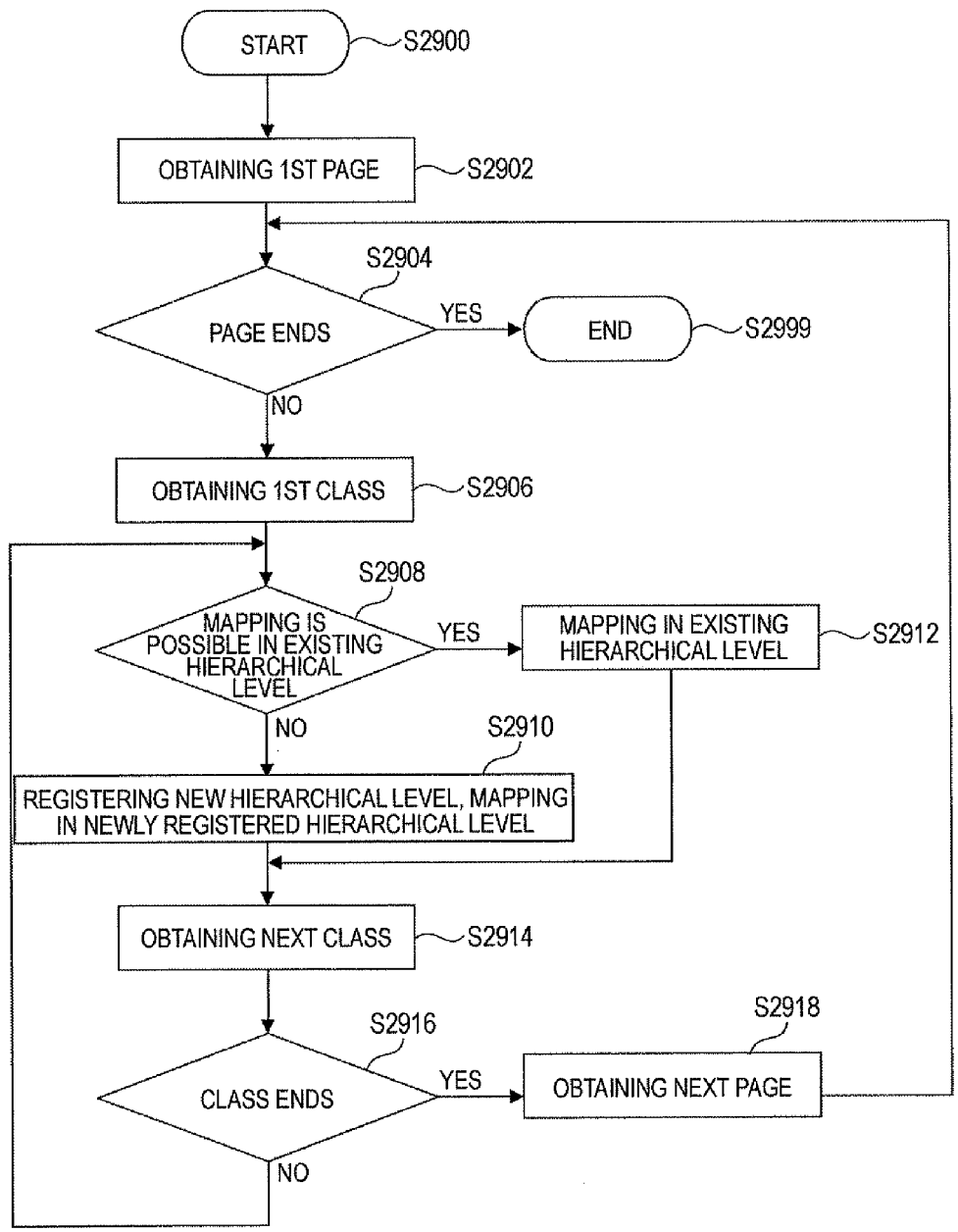
FIG. 29 is a flowchart showing an exemplary processing according to a fifth exemplary embodiment.

FIG. 29 is a flowchart showing an exemplary processing by the document format processing module 650 according to the fifth exemplary embodiment. The hierarchical processing module 2220 in the document format processing module 650 determines the inter-page hierarchical structure for the pages sequentially from the first page to the last page on a page-to-page basis. Before executing the processing of the flowchart, the document format processing module 650 is configured to execute the processing described in the third exemplary embodiment. Note it is assumed that each page has already been hierarchically structured, for instance, using hierarchical levels of pages, paragraphs, sub-paragraphs, and the like. However, it is assumed that no inter-page hierarchical level exists across plural pages.

In Step S2902, the first page is obtained. In this phase, no inter-page hierarchical level exists across plural pages.

In Step S2904, it is determined whether or not all the pages within an object document are obtained. If all the pages are obtained (i.e., there is no next page left), the processing is finished (Step S2999). Otherwise, the processing proceeds to Step S2906.

In Step S2906, the first class in the page is obtained.

In Step S2908, it is determined whether or not mapping is possible for an existing hierarchical level. If mapping is possible for the existing hierarchical level, the processing proceeds to Step S2912. Otherwise, the processing proceeds to Step S2910. In the determination step, if there is no existing hierarchical level, it is determined that mapping is impossible. Even if there is an existing hierarchical level, it is also determined that mapping is impossible when an attribute of the existing hierarchical level and an attribute value of the object class are not matched. If there is an existing hierarchical level, however, it is determined that mapping is possible when an attribute of the existing hierarchical level and an attribute value of the object class are matched.

In Step S2910, a new hierarchical level is registered and mapping is executed with respect to the new hierarchical level.

In Step S2912, mapping is executed for the existing hierarchical level.

In Step S2914, the next class within the page is obtained.

In Step S2916, it is determined whether or not all the classes within the page are obtained. If all the classes are obtained (there is no next class left within the page), the processing proceeds to Step S2918. Otherwise, the processing returns to Step S2908.

In Step S2918, the next page is obtained.

Now, a processing using the title-attribute value table 2500 exemplified in FIG. 25 will be described.

Page 1 has a hierarchical structure having two hierarchical levels of a page title and paragraph titles. Therefore, Page 1 is formed by two classes.

In Page 1, the highest hierarchical level (page title) is set to be the first class (Step S2906).

There is no existing hierarchical level in Page 1. Therefore, mapping is impossible for the existing hierarchical level. In Step S2908, the processing proceeds to Step S2910.

In the case of the first class in Page 1, Hierarchical level 1 is newly registered, and the first class is further mapped in the Hierarchical level 1 (Step S2910).

The second class in Page 1 is a hierarchical level of paragraphs. There is also no existing hierarchical level for the class. Therefore, mapping is impossible for the existing hierarchical level. The processing proceeds to Step S2910 even in Step S2908 of the second round. Then, Hierarchical level 2 is newly registered, and the second class in Page 1 is further mapped in Hierarchical level 2 (Step S2910).

Mapping of the classes in Page 1 is thus completed (Y in Step S2916), and Page 2 is subsequently obtained (Step S2918).

Page 2 has a hierarchical structure having three hierarchical levels of a page title, paragraph titles, a sub-paragraph title. Accordingly, Page 2 is formed by three classes.

First, Class 1 of Page 2 is the page title of Page 2. The attribute value of the page title is 12. Note attribute values may be preliminarily extracted by the attribute value processing module 2210 for producing the title-attribute value table 2500. Alternatively, attribute values may be extracted as necessary. An existing hierarchical level having attribute value 12 is Hierarchical level 2. Therefore, the page title of Page 2 is mapped in Hierarchical level 2 (Step S2912). In short, an attribute value of a title having mapped in an existing hierarchical level, corresponding to an attribute value of an object title, is searched in the title-attribute value table 2500. The hierarchical level of the title having the searched attribute value is assigned to the object title.

An attribute value of paragraphs in Page 2 (i.e., the subsequent class) is 12. Therefore, paragraphs in Page 2 are also mapped in Hierarchical level 2 (Step S2912).

An attribute value of a sub-paragraph in Page 2 (further subsequent class) is 10. There is no existing hierarchical level corresponding to this (N in Step S2908). Therefore, a new hierarchical level is set. The attribute value 10 is less than any of the attribute values of the existing hierarchical levels. Therefore, Hierarchical level 3 is newly registered. The sub-paragraph in Page 2 is mapped in Hierarchical level 3 (Step S2910).

Next, Page 3 is obtained (Step S2918).

An attribute value of the page title of Page 3 is 18. There is no existing hierarchical level corresponding to this (N in Step S2908), and therefore a new hierarchical level is set (Step S2910).

The hierarchical levels registered so far are shown in a hierarchical level-attribute table 3000 exemplified in FIG. 30. The hierarchical level-attribute table 3000 includes hierarchical level number fields 3010 and attribute value fields 3020. The hierarchical level number fields 3010 store an inter-page hierarchical structure whereas the attribute value fields 3020 store attribute values assigned to the titles in the hierarchical structure. Specifically, "20", "12" and "10" are assigned to attribute values of Hierarchical levels 1, 2 and 3, respectively.

The attribute value 18 is greater than the attribute value of Hierarchical level 2 and less than that of Hierarchical level 1. Therefore, a new hierarchical level is created between Hierarchical levels 1 and 2. Further, the numbers of Hierarchical level 2 and subsequent hierarchical levels are shifted by one (i.e., hierarchical level number is increased by one). Specifically, the relation between hierarchical levels and attribute values is shown in the hierarchical level-attribute table 3100 exemplified in FIG. 31. In the table 3100, "18" is registered as an attribute value of Hierarchical level 3, and Hierarchical level 3 in the hierarchical level-attribute table 3000 is registered as Hierarchical level 4. Note the hierarchical level-attribute table 3000 (hierarchical level-attribute table 3100) is stored in the document format processing module 650 and each value of the table is stored by the hierarchical processing module 2220.

Then, the page title of Page 3 is mapped in Hierarchical level 2 (Step S2910).

An attribute value of the paragraphs (i.e., Class 2) of Page 3 is 12. Therefore, the paragraphs of Page 3 is mapped in Hierarchical level 3 (Step S2912).

In the aforementioned example, if there is an existing hierarchical level having an attribute value that is matched with a current attribute value, the current attribute value is registered in the hierarchical level. If there is no existing hierarchical level having an attribute value that is matched with a current attribute value, a new hierarchical level is created and the current attribute value is registered in the new hierarchical level.

However, even if a current attribute value is not matched with an attribute value of an existing hierarchical level, margins of error may be tolerated. For example, if a difference between a current attribute value and an attribute value of an existing hierarchical level is less than or equal to a preliminarily set threshold, the current attribute value may be registered in the hierarchical level. If there are plural existing hierarchical levels satisfy the above condition that a difference between a current attribute value and an attribute value of an existing hierarchical level is less than or equal to a preliminarily set threshold, the current attribute value may be registered in the existing hierarchical level that is determined to have a closest attribute value to the current attribute value as a result of comparison. Only if there is no existing hierarchical level satisfying the above condition that a difference between a current attribute value and an attribute value of an existing hierarchical level is less than or equal to a preliminarily set threshold, a new hierarchical level is registered.

An exemplary hardware configuration of an information processing device according to the foregoing exemplary embodiments will be explained with reference to FIG. 32. The exemplary hardware configuration shown in FIG. 32 is configured by a personal computer (PC) or the like, and includes a data scanning unit 3217 (e.g., scanner) and a data outputting unit 3218 (e.g., printer).

CPU (Central Processing Unit) 3201 is a control unit that executes a processing in accordance with a computer program describing execution sequence of various modules described in the foregoing exemplary embodiments such as the page processing module 110, the page title determination processing module 120, the document format processing module 130, the paragraph division processing module 630, the paragraph title determination processing module 640, the line recognition processing module 1010, the line feature calculation module 1020, the paragraph recognition processing module 1030, the paragraph integration processing module 1040, the character information correction processing module 1050, the attribute value processing module 2210, and the hierarchical processing module 2220.

ROM (Read Only Memory) 3202 stores programs, computation parameters, etc. used by CPU 3201. RAM (Random Access Memory) 3203 stores programs to be used when CPU 3201 executes a processing, parameters arbitrarily changing in the execution, etc. These components are connected to each other through a host bus 3204 formed by a CPU bus, etc.

The host bus 3204 is connected to an external bus 3206 such as a PCI (Peripheral Component Interconnect/Interface) bus through a bridge 3205.

A keyboard 3208 and a pointing device 3209 (e.g., mouse) are input devices operated by an operator. A display 3210 is, for instance, a LCD (Liquid Crystal Display), CRT (Cathode Ray Tube) or the like, and displays various information as text and image information.

HDD (Hard Disk Drive) 3211 includes a hard disk therein, and drives the hard disk for causing it to record/play programs and information to be executed by CPU 3201. Accordingly, received documents, output documents, etc. are stored in the hard disk. Further, various computer programs such as other various data processing programs are stored in the hard disk.

A drive 3212 reads out data/program recorded in a magnetic disk, an optical disk or a magneto-optical disk, which is loaded therein, or a removable recording medium 3213 (e.g., semiconductor memory), and provides the data/program to RAM 3203 connected thereto through an interface 3207, the external bus 3206, the bridge 3205 and the host bus 3204. Similarly to the hard disk, the removable recording medium 3213 also can be used as a data recording area.

A connection port 3214 is used for connecting an external connection device 3215 to the information processing device, and includes a connection part such as USB, IEEE1394, etc. The connection port 3214 is connected to CPU 3201, etc through the interface 3207, the external bus 3206, the bridge 3205, the host bus 3204, etc. A communication unit 3216 is connected to the network and executes a data communication processing with the external devices. A data scanning unit 3217 is, for instance, a scanner and executes a processing of scanning a document. A data outputting unit 3218 is, for instance, a printer and executes a processing of outputting the document data.

Note the hardware configuration of the information processing device shown in FIG. 32 is only an exemplary configuration. Therefore, the configuration of the foregoing exemplary embodiments is not limited to that shown in FIG. 32, and may be any suitable configuration as long as it can execute the modules described in the foregoing exemplary embodiments. For example, a part of the modules may be formed by hardware for exclusively use (e.g., Application Specific Integrated Circuit: ASIC). Further, a part of the modules may be disposed in the external system and may be connected through a communication line. Moreover, plural systems shown in FIG. 32 may be connected to each other through a communication line, and may operate in a coordinated manner. Further, the hardware configuration may be installed in a photocopier, a facsimile machine, a scanner, a printer, a multifunction machine (i.e., an image processing apparatus having at least two of functions of a scanner, a printer, a multifunction machine, a facsimile machine, etc), etc.

The document to be received by the page processing module 110/610 of the foregoing exemplary embodiments is exemplified as a multi-page TIFF document. However, it may be a different kind of document. For example, the document may be formed by plural image files. The image files may be TIFF files, GIF files, PNG files, PBM files, JPEG files, etc. In this case, page numbers are assigned to the plural image files, respectively.

Alternatively, the document to be received by the page processing module 110/610 of the foregoing exemplary embodiments may be an electronic document such as a PDF document. A text code is assigned to each page of the electronic document (e.g., PDF document) and an image is attached thereto. The text code may be used as it is (as a result of the foregoing character recognition). Alternatively, a character recognition processing may be executed for the attached image.

Alternatively, the document to be received by the page processing module 110/610 of the foregoing exemplary embodiments may be a file for a word processor. In this case, the page processing module 110/610 processes the format of the word processor file so that pages can be fixed. For example, pages may be fixed by producing a print image through a printing processing. Alternatively, pages may be fixed by once converting the file format into PDF, PS or the like. As a result of page fixation, a text code is assigned to the file and an image is attached to the file. The text code may be used as it is (as a result of the foregoing character recognition). Alternatively, a character recognition processing may be executed for the attached image.

The foregoing page processing modules 110, 610 produce and output the page numbers. However, they may not necessarily execute the processing. In this case, the document format processing module 130 and the document format processing module 650 may not assign the page numbers to pages. Similarly, the paragraph division processing module 630 produces and outputs the paragraph numbers. However, it may not necessarily execute the processing. In this case, the document format processing module 650 may not assign the paragraph numbers to paragraphs. When modules execute a processing for the identical page/paragraph, a specific code may be used for uniquely specifying the page/paragraph.

The format of the document to be output by the document format processing module 130 and the document format processing module 650 of the foregoing exemplary embodiments may not be necessarily limited to PDF, and may be any suitable format as long as it can provide the outline information.

In the foregoing exemplary embodiments, the image information of a page is exemplified as the page information. However, the page information is not limited to the image information. The page processing modules 110, 610 may execute a character recognition processing with respect to the entire page and may transfer a result of character recognition and the image information as the page information. In this case, a result of character recognition may be provided in the output document through the document format processing to be executed by the document format processing modules 130, 650.

In the foregoing exemplary embodiments, a title candidate of a page/paragraph may be a blank. In this case, a page number may be assigned to a page title for preventing the outline from being displayed as a blank. Specifically, the page title determination processing module 120/620 may determine a page title using a page number produced by the page processing module 110/610. Further, the paragraph title determination processing module 640 may determine a paragraph title using a paragraph number produced by the paragraph division processing module 630. Also, a page/paragraph number may be added to the top or the end of a title not only in a case that a title candidate of a page/paragraph is blank but also in other cases.

For example, the following description is given as a page title within a document format to be output by the document format processing module 130/650:

<Page#>Page Title

Here, "#" in the description indicates a page number. Further, "Page Title" indicates a page title (page number) determined by the page title determination processing module 120/620.

Further, the following description is given as a paragraph title:

<Para#>Paragraph Title

Here, "#" indicates a paragraph number. Further, "Paragraph Title" indicates a paragraph title (paragraph number) determined by the paragraph division processing module 630.

The foregoing exemplary embodiments have described a case that only Outline level 1 is set or Outline levels 1 and 2 are set. However, Outline level 3 may be set by further dividing each paragraph into sub-paragraphs, sentences, rows, etc. Alternatively, Outline level 3 may be set by dividing each paragraph into sub-paragraphs, and Outline level 4 may be set by dividing each sub-paragraph into sentences, rows, etc.

The processing for increasing the number of the outline levels is equivalent to that for increasing the number of the outline levels from 1 to 2. In other words, a module may be added that receives the paragraph information to be output by the paragraph division processing module 630, divides each paragraph into sub-paragraphs, sentences, rows, etc., and determines the title thereof.

In the explanation of the paragraph division processing module 630, etc., it is mainly described that row height is used for a horizontally described document. Similarly, column width is used for a vertically described document.

The formulas are used for the foregoing explanation, but they may include equivalence thereof. "Equivalence" to the formulas herein includes not only formulas, but also deformation of the formulas to the extent that it does not have impact on a final result, solution of the formulas using a algorithmic solution, etc.

The foregoing exemplary embodiments may be combined (including application of a module in an exemplary embodiment to another exemplary embodiment, exchange of a module in an exemplary embodiment with that in another exemplary embodiment, etc). Further, the well-known arts described in Related Art may be adopted as the content of the processing by the modules.

Further, the phrases "greater than or equal to", "less than or equal to", "greater than", "less than", etc. have been used for a comparison between a value with a preliminarily set value in the foregoing exemplary embodiments. However, the respective phrases may be expressed as "greater than", "less than", "greater than or equal to", "less than or equal to", etc. as long as results of the comparisons are consistent.

The foregoing program may be provided while being stored in a recording medium. Alternatively, the program may be provided through a communication tool. In this case, the foregoing program may be considered to be an invention of "computer readable recording medium storing a program".

The term "computer readable recording medium storing a program" refers to a computer-readable recording medium storing a program used for installation, running, distribution, etc. of a program.

The recording medium includes, for instance, a digital versatile disk (DVD) including "DVD-R, DVD-RW, DVD-RAM, etc" (i.e., standards set by a DVD forum) and "DVD+R, DVD+RW, etc" (i.e., standards set by DVD+RW), a compact disk (CD) including a CD read-only memory (CD-ROM), a CD recordable (CD-R), a CD rewritable (CD-RW), etc., a Blu-ray Disk (registered trademark), a magneto-optical disk (MO), a flexible disk (FD), a magnetic tape, a hard disk, a read-only memory (ROM), an electrically erasable and programmable read-only memory (EEPROM), a flash memory, a random access memory (RAM), etc.

Further, entirety or a part of the foregoing program may be stored, distributed, etc. while being recorded in the foregoing recording medium. Alternatively, entirety or a part of the foregoing program may be transferred through the communication using transmission medium such as the wired network used in the local area network (LAN), the metropolitan area network (MAN), the wide area network (WAN), the Internet, the Intranet, the Extranet, etc., the wireless communication network, and combination thereof. Alternatively, entirety or a part of the foregoing program may be carried through carrier waves.

Further, the foregoing program may be a part of another program or may be recorded in a recording medium together with another individual program. Alternatively, the foregoing program may be recorded in plural recording media while being divided into plural pieces. Yet alternatively, the foregoing program may be recorded in any suitable form (e.g., compression, encryption, etc) as long as it is recoverable.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling other skilled in the art to understand the invention for various embodiments and with the various modifications as are suited to the particular use contemplated. It is intended that the scope of the invention be defined by the following claims and their equivalents.

What is claimed is:

1. An information processing device, comprising:
a document receiving unit that receives a document containing at least one page, wherein positions of document components of a page of the at least one page are fixed within the page;
a page dividing unit that divides the document received by the document receiving unit into at least one page;
a page heading determining unit that determines a heading of a page of the at least one page divided by the page dividing unit based on components included in the page;
a page title determination processing unit that determines a title for each page of the at least one page of the document;
a title candidate registration unit that registers a first title candidate if no previous title candidates have been registered, and registers a new title candidate in place of the first title candidate based on at least a case-by-case evaluation of a font size ratio between the new title candidate and the first title candidate and a predetermined threshold value; and a processing unit that assigns the heading determined by the page heading determining unit to the page divided by the page dividing unit as first level outline information of the page.

2. The information processing device according to claim 1, further comprising:

a paragraph dividing unit that divides the page divided by the dividing unit into at least one paragraph; and a paragraph heading determining unit that determines a heading of a paragraph of the at least one paragraph divided by the paragraph dividing unit based on components included in the paragraph, wherein the processing unit assigns the heading determined by the paragraph heading determining unit to the page divided by the page dividing unit as second level outline information of the page.

3. The information processing device according to claim 1, wherein the document includes a character image, the information processing device further comprising:

a character recognition unit that recognizes a character represented by the image included in the document, and the page heading determining unit determines the heading of the page using a result of recognition recognized by the character recognition unit, or the result of recognition recognized by the character recognition unit and at least one of a position, a color, and a size of the character image.

4. The information processing device according to claim 2, wherein the document includes a character image, the information processing device further comprising:

a character recognition unit that recognizes a character represented by the image included in the document, and the paragraph heading determining unit determines the heading of the paragraph using a result of recognition recognized by the character recognition unit, or the result of recognition recognized by the character recognition unit and at least one of a position, a color, and a size of the character image.

5. The information processing device according to claim 1, further comprising:

a page number producing unit that produces a page number of the page divided by the page dividing unit, wherein the page heading determining unit determines the heading of the page using the page number produced by the page number producing unit.

6. The information processing device according to claim 2, further comprising:

a page number producing unit that produces a page number of the page divided by the page dividing unit, wherein the page heading determining unit determines the heading of the page using the page number produced by the page number producing unit.

7. The information processing device according to claim 2, further comprising:

a paragraph number producing unit that produces a paragraph number of the paragraph divided by the paragraph dividing unit, wherein the paragraph heading determining unit determines the heading of the paragraph using the paragraph number produced by the paragraph number producing unit.

8. The information processing device according to claim 2, wherein the processing unit comprises:

an attribute extracting unit that extracts either an attribute of the heading of the page determined by the page heading determining unit or an attribute of the heading of the paragraph determined by the paragraph heading determining unit; and a hierarchical structure determining unit that determines a hierarchical structure extending across a plurality of pages based on either the attribute of the heading of the page or the attribute of the heading of the paragraph extracted by the attribute extracting unit.

9. The information processing device according to claim 4, wherein the processing unit comprises:

an attribute extracting unit that extracts either attribute of the heading of the page determined by the page heading determining unit or attribute of the heading of the paragraph determined by the paragraph heading determining unit; and a hierarchical structure determining unit that determines a hierarchical structure extending across a plurality of pages based on either the attribute of the heading of the page or the attribute of the heading of the paragraph extracted by the attribute extracting unit.

10. The information processing device according to claim 6, wherein the processing unit comprises:

an attribute extracting unit that extracts either an attribute of the heading of the page determined by the page heading determining unit or an attribute of the heading of the paragraph determined by the paragraph heading determining unit; and a hierarchical structure determining unit that determines a hierarchical structure extending across a plurality of pages based on either the attribute of the heading of the page or the attribute of the heading of the paragraph extracted by the attribute extracting unit.

11. The information processing device according to claim 7, wherein the processing unit comprises:

an attribute extracting unit that extracts either attribute of the heading of the page determined by the page heading determining unit or attribute of the heading of the paragraph determined by the paragraph heading determining unit; and a hierarchical structure determining unit that determines a hierarchical structure extending across a plurality of pages based on either the attribute of the heading of the page or the attribute of the heading of the paragraph extracted by the attribute extracting unit.

12. The information processing device according to claim 8, wherein the hierarchical structure determining unit sequentially determines a hierarchical structure of each page.

13. A non-transitory computer readable medium storing a program causing a computer to execute a process for processing information, the process comprising:

receiving a document containing at least one page, wherein positions of document components of a page of the at least one page are fixed within the page;

dividing the received document into at least one page;

determining a heading of a page of the at least one page based on components included in the page;

determining a page title for each page of the at least one page of the document;

registering a first title candidate if no previous title candidates have been registered, and registering a new title candidate in place of the first title candidate based on at least a case-by-case evaluation of a font size ratio between the new title candidate and the first title candidate and a predetermined threshold value; and assigning the determined heading to the divided page as first level outline information of the page.

14. A method for processing information, comprising:
receiving a document containing at least one page, wherein positions of document components of a page of the at least one page are fixed within the page;
dividing the received document into at least one page;
determining a heading of a page of the at least one page based on components included in the page;
determining a page title for each page of the at least one page of the document;
registering a first title candidate if no previous title candidates have been registered, and registering a new title candidate in place of the first title candidate based on at least a case-by-case evaluation of a font size ratio between the new title candidate and the first title candidate and a predetermined threshold value; and
assigning the determined heading to the divided page as first level outline information of the page.

15. The information processing device of claim 1, further comprising a line recognition processing module that registers characters into individual rows based on at least an average inter-character spacing value calculated for an individual row.

* * * * *